(12) United States Patent
Foster et al.

(10) Patent No.: US 7,394,761 B2
(45) Date of Patent: Jul. 1, 2008

(54) SYSTEM AND METHOD FOR DELIVERING MESSAGES USING ALTERNATE MODES OF COMMUNICATION

(75) Inventors: Dayton Foster, Calgary (CA); Barry Shilmover, Calgary (CA); Kevin Kerstens, Calgary (CA)

(73) Assignee: Avocent Huntsville Corporation, Huntsville, AL (US)

( * ) Notice: Subject to any disclaimer, the term of this patent is extended or adjusted under 35 U.S.C. 154(b) by 919 days.

(21) Appl. No.: 10/424,735

(22) Filed: Apr. 29, 2003

(65) Prior Publication Data

US 2004/0218609 A1 Nov. 4, 2004

(51) Int. Cl.
*H04L 1/00* (2006.01)
*H04L 9/00* (2006.01)
*H04Q 7/00* (2006.01)
*H04J 3/16* (2006.01)
*G06F 15/173* (2006.01)
*G06F 11/00* (2006.01)

(52) U.S. Cl. .................. 370/227; 370/329; 370/465; 709/224; 709/239; 713/150; 714/2

(58) Field of Classification Search ............ None
See application file for complete search history.

(56) References Cited

U.S. PATENT DOCUMENTS

| 5,249,220 | A | 9/1993 | Moskowitz et al. |
| 5,694,595 | A | 12/1997 | Jacobs et al. |
| 5,867,688 | A | 2/1999 | Simmon |
| 5,913,034 | A | 6/1999 | Malcolm |
| 5,929,792 | A | 7/1999 | Herriot |
| 5,941,988 | A | 8/1999 | Bhagwat et al. |
| 5,960,177 | A | 9/1999 | Tanno |
| 6,085,227 | A | 7/2000 | Edlund et al. |
| 6,137,473 | A | 10/2000 | Cortopassi |
| 6,263,437 | B1 | 7/2001 | Liao et al. |
| 6,304,899 | B1 | 10/2001 | Cromer |
| 6,314,351 | B1 | 11/2001 | Chutorash |
| 6,334,150 | B1 | 12/2001 | Cromer |
| 6,680,730 | B1 | 1/2004 | Shields et al. |
| 6,681,250 | B1 | 1/2004 | Thomas et al. |
| 6,813,507 | B1 | 11/2004 | Gress et al. |

(Continued)

FOREIGN PATENT DOCUMENTS

EP 0 828 400 A1 11/1998

(Continued)

OTHER PUBLICATIONS

TABLETMedia, TABLETMedia Delivers Voice Software to New Toshiba PDA Devices, Press Release, Oct. 27, 2003, California, US.

(Continued)

*Primary Examiner*—Huy D. Vu
*Assistant Examiner*—Nittaya Juntima
(74) *Attorney, Agent, or Firm*—Davidson Berquist Jackson & Gowdey LLP

(57) ABSTRACT

There is provided a novel system and method for delivering messages using alternate modes of communication when a primary mode of communication is not available as may happen in emergent circumstances such as those that arise during a terrorist attack causing damage to communications infrastructure.

30 Claims, 6 Drawing Sheets

U.S. PATENT DOCUMENTS

| | | | |
|---|---|---|---|
| 6,862,708 | B1 | 3/2005 | Higginbotham et al. |
| 7,009,952 | B1 * | 3/2006 | Razavilar et al. ............ 370/331 |
| 7,010,294 | B1 | 3/2006 | Pyotsia et al. |
| 7,024,591 | B2 * | 4/2006 | Moody et al. ................. 714/43 |
| 7,089,587 | B2 * | 8/2006 | Allen et al. ................... 726/14 |
| 7,197,569 | B2 * | 3/2007 | Dowling ..................... 709/230 |
| 7,228,438 | B2 | 6/2007 | Bushmitch et al. |
| 2001/0016907 | A1 | 8/2001 | Kang et al. |
| 2001/0047410 | A1 | 11/2001 | Defosse |
| 2002/0016829 | A1 | 2/2002 | Defosse |
| 2002/0046352 | A1 | 4/2002 | Ludwig |
| 2002/0052940 | A1 | 5/2002 | Myers |
| 2002/0059434 | A1 | 5/2002 | Karaoguz |
| 2002/0068559 | A1 * | 6/2002 | Sharma et al. .............. 455/423 |
| 2002/0069259 | A1 | 6/2002 | Kushwaha |
| 2002/0078198 | A1 | 6/2002 | Buchbinder et al. |
| 2002/0083044 | A1 | 6/2002 | Kaplan |
| 2002/0095604 | A1 | 7/2002 | Hausler |
| 2002/0103850 | A1 | 8/2002 | Moyer et al. |
| 2002/0112046 | A1 | 8/2002 | Kushwaha et al. |
| 2002/0133746 | A1 * | 9/2002 | Chen et al. .................... 714/13 |
| 2002/0193131 | A1 | 12/2002 | Fleshler |
| 2003/0003931 | A1 | 1/2003 | Silventoinen et al. |
| 2003/0056096 | A1 | 3/2003 | Albert et al. |
| 2003/0061346 | A1 | 3/2003 | Pekary |
| 2003/0084331 | A1 | 5/2003 | Dixon et al. |
| 2003/0105854 | A1 | 6/2003 | Thorsteinsson et al. |
| 2003/0236983 | A1 | 12/2003 | Mihm |
| 2004/0019643 | A1 | 1/2004 | Zirnstein |
| 2004/0073791 | A1 | 4/2004 | Vollmer et al. |
| 2004/0083393 | A1 | 4/2004 | Jordan et al. |
| 2004/0171376 | A1 | 9/2004 | Engstrom et al. |
| 2004/0187018 | A1 | 9/2004 | Owen et al. |
| 2005/0044184 | A1 | 2/2005 | Thomas et al. |
| 2005/0068191 | A1 | 3/2005 | Eschke et al. |

FOREIGN PATENT DOCUMENTS

| | | |
|---|---|---|
| EP | 0898216 | 2/1999 |
| EP | 1 175 061 A2 | 1/2002 |
| GB | 2367709 | 4/2002 |
| GB | 2 369 019 A | 5/2002 |
| WO | WO 01/91400 | 11/2001 |
| WO | WO 02/39299 A1 | 5/2002 |
| WO | WO 02/079983 | 10/2002 |
| WO | WO 2004/008693 A1 | 1/2004 |

OTHER PUBLICATIONS

Intel Corporation, "Optimizing Rich Media IP Conferencing Systems," 2002.
Fujitsu Transaction Solutions Inc., "Fujitsu's iPAD to Use TABLETMedia's iFon Software for VoIP," Press Release, Apr. 2003, Texas, US.
NEC America, Inc., "NEC America to Integrate TABLETMedia's Software Client Into Its Internet Telephony Platforms," Press Release, Sep. 2002.
TABLETMedia, iFon, "VoIP and Video Communications on a Pocket PC," 2001-2002, California, US.
PCT Written Opinion of the International Searching Authority for PCT/CA2004/000633 mailed Jan. 7, 2005.
PCT International Search Report for PCT/CA2004/000633 mailed Jan. 7, 2005.
PCT International Preliminary Report on Patentability mailed Nov. 4, 2005 in PCT Application No. PCT/CA2004/000633.
Freier et al., "The SSL Protocol Version 3.0", http://wp.netscape.com/eng/ssl3/draft302.txt, pp. 18-19, 28, 41-42, and 52, 1996.
International Search Report from corresponding PCT Application No. PCT/CA2003/002036 mailed on Aug. 4, 2004.
TABLETmedia iFonTM Datasheet "The client for rich fixed-mobile convergence," TABLETmedia, Inc., San Francisco, CA, c2001-2006, 2 pages.
"Wireless Application Protocol White Paper," Wireless Internet Today, Jun. 2000, XP-001069119, 18 pages.
Eun-Kyeong Kwon et al., "Integrated Transport Layer Security: End-to-End Security Model between WTLS and TLS," Information Networking, 2001. Proceedings, 15th International Conference on Jan. 31-Feb. 2, IEEE, 2001, pp. 65-71, ISBN: 0-7695-0951-7.
European Search Report in related European Application No. 03782045.3, dated Nov. 29, 2007.
Yoshihiro Ohba and Shinichi Baba, "PANA over TLS," Internet Draft, IETF Standard-Working-Draft, Internet Engineering Task Force, Sep. 2002, 26 pages.
European Search Report in European patent application No. 03782045.3, dated Jan. 25, 2007.

* cited by examiner

SYSTEM AND METHOD FOR DELIVERING MESSAGES USING ALTERNATE MODES OF COMMUNICATION

FIELD OF THE INVENTION

The present invention relates generally to wireless communication between a computer and a mobile device and particularly to remote secure communication.

BACKGROUND OF THE INVENTION

Machine-to-machine or mobile-to-machine wireless connectivity is available in a variety of forms for a variety of applications. All of those forms need to broadcast a data stream during at least one leg of the communication path, thereby traditionally making them unsuitable for delivering messages in high-security applications such as network administration. Consequently, the use of non-broadcast modes is desirable over as much of that path as possible, for example the Internet is an inexpensive means for reducing the exposure of a data stream to interception. However, when the most significant events requiring network administration arise, those same events may result in loss of access to various modes, including the Internet. Consequently, there is a need to be ready and able to efficiently deliver a communication stream using at least one alternate mode in the event the primary mode is not available, such as happens when a cable, a router or an intermediate server fails.

Examples of known infrastructure supporting different modes of communication include:
1. telephony (analog and digital)—including MAN or WAN using them
   land line voice channels—PSTN or ISDN (wire or fibre-optic)
   cellular voice—UMTS, CDMA, TDMA, and GSM (GPRS, HSCSD, SMS)
   cellular data—DataTAC, Mobitex, MMS
2. microwave network or direct connection
3. satellite—including Globalstar, MSAT, DataNet
4. other radio—including Bluetooth, 802.11b WLAN, VHF, UHF
5. laser, infrared, and other direct connections Examples of known devices capable of use for multi-mode communication (currently tend to offer only cellular and satellite in a single device) include:
1. The QUALCOMM Globalstar GSP-1600 Portable Tri-Mode Satellite Phone for use in areas where cellular coverage is either unavailable or inaccessible. The GSP-1600 permits: digital calls (utilizing CDMA (IS-95)), analog calls (AMPS (IS-41), and calls on the Globalstar system, for use when digital and analog are not available.
2. Siemens S55 tri-band E-GSM, GSM 900/1800/1900 GSM and Bluetooth phone.
3. The Nokia 7210 tri-band phone operates in three networks—EGSM 900 and GSM 1800/1900—providing coverage on five continents.
4. The Nokia D211 is a multi-mode radio card for your compatible portable computer that enables network access through GPRS, HSCSD, and wireless LAN networks.

Various 'wired' methods are an important element of any alternate path for remote access since wireless technology is also susceptible to attack or technical failure. Telephone modems embedded in or connected to a wireless input device ("WID") or a managed entity (also, IP based LAN or WLAN, MODBUS, and RS-232, 422, 485) are examples, but it is also important to understand distinctions between the many forms of wired infrastructure available.

In this document a number of defined words and phrases are used such that they have been better defined below:

Public Switched Telephone Network—is the collection of interconnected systems operated by various telephone companies and administrations (telcos and PTTs) around the world, "PSTN" is also known as the Plain Old Telephone System (POTS) in contrast to xDSL ("Digital Subscriber Line") and ISDN ("Integrated Services Digital Network"). The PSTN began as analogue with a human-operated circuit switching system that progressed to electromechanical switching, but is now almost completely digital and electronically switched—often except for the final connection (the "last mile") to the subscriber. The output signal of voice phone devices remains analogue, and is usually transmitted over a twisted pair cable, until it reaches a telephone company central office where it is normally digitised by taking 8000 samples per second at 8 bits per sample to form a 64 kb/s data stream known as DS0. Several DS0 data streams or channels are combined: in the US 24 DS0 channels are multiplexed into a T1, in Europe 31 DS0 channels are multiplexed into an E1 line. These can be further combined into larger streams for transmission over high-bandwidth core trunk lines, at the receiving end of which: the channels are de-multiplexed and the digital signals are restored to analogue for delivery to the recipient device. While the impact of such conversions are inaudible for the purposes of voice communication they can affect digital communication, such that additional signal processing is required in order to use such infrastructure as an alternate mode for network administration. The additional signal processing may be provided: by the channel service provider, or by the user, or various combinations of the two.

Integrated Services Digital Network—"ISDN" is a set of communication standards (intended to eventually replace the "PSTN"), offered by local telephone companies, which allow a single wire or optical fibre to carry voice, digital network services and video. ISDN was first published in 1984 and uses existing PSTN infrastructure, but upgraded so that the basic "voice call" is on a 64 kbps all-digital end-to-end channel. Packet and frame modes are also available. There are different capacities of ISDN connection of varying bandwidth, Pulse Code Modulated at different data transfer rates and designated by "DS level" or Data Service level being a classification based on transmitting one or more voice conversations per digitized data stream. The most common DS levels are DS0 (a single conversation) and DS1 (24 conversations multiplexed).

| DS0 | 1 channel | PCM at 64 kbps |
| --- | --- | --- |
| DS1 or T1 | 24 channels | PCM at 1.544 Mbps |
| DS1C or T1C | 48 channels | PCM at 3.15 Mbps |
| DS2 or T2 | 96 channels | PCM at 6.31 Mbps |
| DS3 or T3 | 672 channels | PCM at 44.736 Mbps |
| DS4 or T4 | 4032 channels | PCM at 274.1 Mbps |

Each channel is equivalent to one voice channel. T1C through T4 are rarely used apart from microwave links. A Basic Rate Interface is two 64K "bearer" channels and a single "delta" channel. A Primary Rate Interface ("PRI") in North America and Japan consists of 24 channels, usually 23 B+1 D channel with the same physical interface as T1. Elsewhere the PRI usually has 30 B+1 D channel using an E1 interface. A Terminal Adaptor (TA) can be used to connect ISDN channels to existing data interfaces such as EIA-232 and V.35. Different services may be requested by specifying different values in the "Bearer Capability" field in the call setup message. One ISDN service is "telephony" (i.e. voice) that can be provided using less than the full 64 kbps bandwidth but requires the same special processing or bit diddling as ordinary PSTN calls. Data calls have a Bearer Capability of "64 kbps unrestricted".

T1 is a common term for a legacy digital carrier (ISDN line) facility used to transmit a DS1 formatted digital signal. T1 transmission uses a bipolar Return To Zero alternate mark inversion line-coding scheme to keep the DC carrier component from saturating the line. Since much infrastructure is based on T1, signals formatted this way are now commonly either further combined for transmission via faster circuits, or de-multiplexed into 64 kbps circuits for distribution. T1 signals can be transported on unshielded twisted pair telephone lines, the signals consisting of pips of a few hundred nanoseconds width, each inverted with respect to the one preceding. At the sending end the signal is 1 volt and no less than 0.01 volts when received such that repeaters are required every 6000 feet. Information is carried in the relative timing of the signals, not their polarity. When a long sequence of bits in the transmitted information would cause no pip to be sent, "bit stuffing" is used so the receiving apparatus will not lose synch with the sending clock. Traditionally, T1 circuits require one twisted pair line for each direction, although newer equipment can use each of the two lines at half the T1 rate, in full-duplex mode, advantageously half the sent and half the received information is mixed on any one line, making low-tech wiretaps less a security threat.

The OSI protocol or "Open Systems Interconnection" layer model comprises 7 specific functional layers, being: Application, Presentation, Session, Transport, Network, Data Link and Physical. Tele services cover all 7 layers of that model and are seen at the terminal equipment. Bearer services cover only the lower 3 layers (Network, Data Link and Physical) of the model and are seen at the interface between the network and subject device. For example GSM "data over cellular" services are part of the GSM "bearer" services defined by the GSM governing body, who define an internationally accepted digital cellular telephony standard that has more than 300 GSM mobile networks. These data capabilities are an enhancement of the original voice-only GSM specification. Wireless network administrators deal mainly with 2 layers, Session and Transport, because it is at these layers that security problems arise when using only generic forms of processing providing flexible access and suitable for business transactions, but not for securing the transfer of administrative commands.

Wireless telephone networks can include many cells, each cell having a base station (a.k.a. Base Transceiver Station, or BTS) that communicates with a Wireless Input Device or "WID" (e.g. a Mobile Subscriber Unit or "MSU") currently located in that cell. When a WID is switched on, it transmits a broadcast signal detected by a BTS with which it establishes communications during a process called registration. Base stations include: receivers, amplifiers, transmitters, an antenna, and other hardware and software for sending and receiving signals and converting between radio frequency ("RF") signals and digital signals. BTS also have access to an uplink that communicates between a cell and the Mobile Switching Center ("MSC") with which it is associated. Uplinks can be fibre-optic cable or wireless means such as microwave operating at 1.544 Mbps or more.

A network typically has several MSCs that handle communication with a cluster of BTS and WIDs. MSCs route all authorized communication in their cluster and issue instructions to the BTS. MSC are also linked to databases recording information necessary to authorize and track WID subscribers, including a Home Location Register (HLR) that records the fact of the registration with a BTS (the physical location of which BTS is known) of each mobile WID within that MSC's coverage area. A mobile WID may be switched off after registration with a particular BTS such that it does not register with a different BTS as it moves into a different service area or cell. The WID may later register with a BTS located a great distance away and in the coverage area of a different MSC. HLR data can be shared among MSCs, however there can be one HLR for an entire network. Digital networks include an authentication center to ensure that a WID or user is who he or she claims to be, thereby reducing piracy. MSCs route communication to the network's Gateway Mobile Switching Center (GMSC) that accepts calls from all MSCs and routes each call to its final destination. There is one GMSC per network, which can route calls to either a wired network (e.g. the InterNet) or directly to another cellular system if the wireline is not available. A person of skill in the art of cellular communication would understand that either a WID or a device seeking communication with a WID may initiate a call.

The sequence of connection for a conventional mobile device comprises:
1. Mobile WID registers with BTS, and may also re-register by linking to new BTS as it moves between cells.
2. BTS alerts MSC respecting cell (hence physical location) in which WID has registered, and MSC updates its primary HLR DB.
3. A pre-authorized call arrives at GMSC for the subject WID.
4. At least one MSC looks to at least one HLR to obtain information from system's DB's to locate the subject WID and the nearest BTS.
5. MSC transfers, via direct fibre-optic or wireless broadcast, the signal (data and/or voice) only to the correct BTS.
6. BTS broadcasts the signal into cell where (if located) subject WID detects and decodes. However, all WIDs and suitable receivers that are active in that cell detect the broadcast, but only a subset are supposed to respond. And, at the cell boundaries more than one BTS may broadcast the signal.

A number of incompatible protocols are used to operate digital cellular networks, including GSM, Code Division Multiple Access (CDMA), and Time Division Multiple Access (TDMA). A GSM network allows data streaming (the digital equivalent of modem transmissions) at speeds of up to 9.6 kpbs, which is slower and two generations older than the v. 90 analogue 56 kbps delivered over standard PSTN lines. The key to delivering these enhanced services is SS 7 (Signaling System Number 7), a robust protocol designed to provide fast, efficient, reliable transfer of signaling information across the GSM. SS 7 is the multimedia specification of GSM, providing data, sound (voice mail) and images (fax mail) to the user. SS 7 enables extremely fast data connections among mobile switching centres (MSCs), permitting the networks to obtain enhanced services data while the call is being connected. The SS 7.05 subset defines SMS (short message services) by which text messages of up 160 characters can be passed to and between GSM mobile devices. CDMA is also known as spread spectrum technology because it uses a low-power signal that is "spread" across a band of frequencies.

Wireless devices use several unique identifiers (e.g. Mobile Identification Number (MIN), System ID (SID), Electronic Serial Number (ESN), Subscriber Identity Module (SIM)) for three main purposes: network identification and operation, subscriber or accounting identification and operation, and security. Network identification numbers such as MIN and SID tell the network who the user is, where the user is located and how the network can reach that user (phone number). These numbers are also used to identify user information to ensure that voice or data signals are not coded for the wrong device, the methods used to ensure this are dependent on the network technology. For example, the CDMA network uses a pair of pseudo-noise ("PN") sequences (PN-sequences are periodic binary sequences that are usually generated by means of a linear feedback shift register) combined with a set of mutually orthogonal codes (called the Walsh code) to ensure orthogonality between the signals for different users receiving from the same base station. This combination of PN code offset, Walsh code assigned and assigned frequency make up the coded channel used for the duration of the call. This type of channel coding is referred to as "Spread Spectrum" modulation, meaning that all users can transmit and receive data at the same time. In contrast the TDMA network divides the channel into sequential time slots and assigns a unique time slice for the duration of the call to each device, which is only allowed to transmit and receive data within its time slice. The SIM module contains other unique identifiers that provide information such as who the carrier is (where the network should send the bill), what advanced calling features are active, and if the user is allowed to make long distance phone calls. Identifiers such as the ESN fall into the category of security and are used to facilitate common security checks that include making sure the device is registered with a valid subscription, and locating stolen wireless devices.

Depending on the network technology a variety of methods are used to ensure that information only passes between the parties to the communication. On the CDMA network each phone call is assigned a unique coded channel. For the duration of the phone call (or data connection) only the parties can send information on that coded channel. Channel Coding is a very complex algorithm that allows the device to create a unique signal that is highly compressed (permitting more connections on the same frequency) and to ensure uniqueness on this frequency. When a connection request is made each party is given a series of numbers that are only valid for the length of time the connection exists, these numbers are used to calculate channel code, modulation, spreading and filtering, which are used to create a uniquely encoded message.

A CDMA call is assigned an identifying code that identifies the call to all active and compatible receiving devices, facilitating the intended receiving phone accepting and storing elements of the call, but in no way blocking other phones from doing the same. Using the identifying code and a low-power signal (limiting the effect of broadcast to the subject cell), a large number of calls can be carried simultaneously on the same group of channels that operate in a sense on an "honor system", hence alternate means are required to preclude unintended recipients using intercepted transmissions. Conventional unique identifiers (e.g. PIN, MAN, IMEI, IP) are akin to the "call codes" of CDMA, which facilitate authorized use by assisting in the identification of the intended recipient device or providing the physical address at which it is expected to be located. The conventional method of using identifiers does not address security at all, because in order to be useful such identifiers must be "sent in the open" permitting mobile recipients to determine upon detection or interception of an identifier whether or not the device should act. Consequently, it is desirable to use an identifier, such as the PIN of a WID, to further encode or otherwise secure since it cannot target transmission to any greater extent than the normal direction of the data stream to an MSC with which the WID has last registered.

TDMA is a technology designed to increase the channel capacity by breaking the data stream into segments and assigning each segment to a different time slot, each slot lasting a fraction of a second, such that a single channel can be used to handle a number of simultaneous phone calls. Unique identifiers are assigned to each WID each time it registers or connects to the network, for a session, to allow the subject WID to encode messages during that session on the TDMA network. An identifier is only valid for the length of the call for which it is used, however they do not ensure privacy or security. The unique identifier only makes it easier for the network to pass information between you and your intended recipient, it does not ensure that third parties do not have access to your unique identifiers or that your signal will not be picked up by an unintended third party. Wireless signals by their broadcast nature are accessible to anyone in proximity of the physical signal. And since the various channel encoding techniques are published algorithm's that are available to the public, they remain susceptible to abuse. Some benefit results from localizing broadcasts to a high probability zone for finding the correct WID, however even so stationary installations such as a Managed Entity remain exposed to improper use of detectable broadcasts by persons seeking access, making it less useful for delivering information securely. GPRS, HSCSD, SMS, and EDGE have encryption features, but are examples of GSM, which is based on TDMA. GSM is deployed worldwide making it an important choice for global remote access, however all cellular networks suffer (to differing degrees) security risk due to the use of open standards over broadcast legs of transmission.

Satellite networks such as Globalstar and MSAT have traditionally been expensive and specialized to handle only voice or data traffic. Although the uplinks are more highly directional and available to fewer participants, satellite communications, particularly the downlinks, are broadcast in nature and cannot be targeted to a particular mobile device—leaving such signals susceptible to interception and abuse. Satellite systems are another viable type of wireless telecommunications service. Instead of sending and receiving signals from a ground-based antenna, wireless phones will communicate via satellites circling the earth. Geosynchronous satellites represent yet another way of providing wireless communications. These satellites, located 22,300 miles above the earth, revolve around the earth once each twenty-four hours—i.e. the same as the earth itself. Communications between two places on earth can take place by using these satellites; one frequency band is used for the uplink, and another for the downlink. Such satellite systems are excellent for the transmission of data, but not for voice communications because of the vast distance and resulting time it takes for an electrical signal to make an earth-satellite-earth round trip, ¼ of a second. A reply from the called subscriber takes another quarter of a second, and the resultant half a second is noticeable. Low Earth Orbit satellites "LEOs" are satellites that communicate directly with handheld telephones on earth. Because these satellites are relatively low (less than 900 miles) they move across the sky quite rapidly and equipment on a satellite acts much like a cellular system (BTS) catching (packets of a) a call originating from earth for transfer to an earth-based switching system (MSC). Here the cell site is moving rather than, or as well as, the WID. Due to the speed of the satellite, it is frequently necessary to transfer a call-in-progress to a second satellite coming over the horizon as part of a string of networked satellites.

Other radio based systems (e.g. Bluetooth, 802.11b, WLAN, VHF, UHF) are either very low power and short range or are very broadly cast leaving them open to interception.

Microwave based communications have become affordable and are of limited range, but are very well-focused making them viable options for select applications, since the security risk of interception is reduced by their increased directional control or targetting.

Laser based communications are clearly the most focused but limited to line-of sight ranges of approximately 15 KM. Infrared—data may be transferred to and from a Managed Entity using IR transceivers. IR transceivers range from low bandwidth devices to multi-Gigabit line-of-sight units designed to connect buildings or towers without the use of wires.

MAN ("Metropolitan Area Network") in wire or fibre-optic lines (typically physically run through subway and other tunnels) is a data network intended to serve an area the size of a large city. An example of a MAN is SMDS (Switched Multimegabit Data Service) an emerging high-speed datagram-based public data network service developed by Bellcore and expected to be widely used by telephone companies as the basis for their data networks.

Each of the above communication technologies standing alone has limited application. And, each of the foregoing modes of communication may be applied to different applications.

The remote configuration and monitoring of a vending machine including the transfer of data respecting status, inventory, product temperature, consumption and other very useful but low security data (that is not highly confidential and for which interruptions are more easily tolerated), is an existing practical application of machine-to-machine communication that may be conducted using different modes. However, the non-critical nature of the vending machine application neither requires nor suggests the need of alternate modes.

In addition to the various modes of communication useful for the various applications it is presently necessary to have some infrastructure or platform in place to permit the devices at each end to exchange data in a meaningful way. There are a number of known hard and soft interface products available for this purpose, examples of which are described below.

The Nokia 30 is a GSM connectivity terminal (i.e. a form of WID) with a built-in SIM card reader, internal antenna and interfaces for connecting to a remote device that can be used as a wireless modem for connecting to the Internet. Nokia offers a GPRS terminal and gateway middleware that bridges the GSM network and the Internet by providing a connection for two-way communication between applications located on a server and within a WID. The gateway provides open interfaces to both the application server and the wireless network, based on open, widely accepted middleware and CORBA architecture—ideal for applications such as surveillance, utility meter reading, machinery services and maintenance business. Developers may also take advantage of all possible bearers for data transmission over a GSM network.

Further, Research In Motion ("RIM") radio modems may be integrated into a range of applications that require wireless connectivity, for example: handhelds, laptops, point-of-sale terminals, bank machines, billboards and other displays, monitoring and metering equipment, vending machines, GPS systems and automobiles. RIM's radio modems are suited for applications in a variety of wireless industries. RIM radio modems are available for all of: GSM™/GPRS, DataTAC and Mobitex. RIM offers the BlackBerry Handheld unit (i.e. a WID) offering instant email ("Always on, Always Connected"), which is akin to an interactive pager. Other known devices are available from Palm, and Handspring.

Hewlett-Packard ("HP") also offers a conventional solution that includes tying together the OpenView product suite components on a server backbone. The Platform provides the infrastructure allowing data communications between devices and Internet-hosted applications. The Gateway is a bridging element between the GSM network and the user intranet and provides wireless connection and Internet protocol (IP) translation between applications located in the user server and in the remote devices, all of which ties into HP's OpenView management environment, used to manage the infrastructure and any alarms that come from the device connected thereto.

Further, Datalink corporation permits Wireless Data Services to be added to its DataNET (RF network) product line, which when combined with conventional UHF/VHF mobile radios is a simple to install, yet technically advanced Wireless Data Network that can provide a low cost alternative to public data networks such as CDPD and MOBITEX in large cities, or it can be quickly set-up to cover a small community with a wireless data network where it is not economically feasible for a Telco to provide packet wireless coverage. DataNET uses conventional UHF or VHF radio technologies with computer and modem technologies to create a wireless data solution for private networks including public data networks.

Ericsson offers Mobitex, which is a secure, reliable, open-standard, two-way digital, high-capacity, wireless packet switching network that makes optimal use of an allocated frequency by using packet switching to deliver an 8 kbp/s bit rate over a single 12.5 kHz channel. Switching intelligence is present at all levels of the network creating minimum overhead. Even base stations are capable of routing traffic within their coverage area, eliminating unnecessary traffic at higher network levels. Mobitex provides automatic error detection and correction to ensure data integrity. Although based on digital cellular technology using overlapping radio cells, unlike other cellular systems Mobitex is a dedicated data network that uses packet switching to ensure that the network is always and instantly accessible and that the customer is billed for the number of packets transmitted, not connection time. For emergency access, Mobitex may be a good choice since it is not as likely to be overwhelmed by traffic as are voice telephone systems in 911 scenarios. To connect to a Mobitex network, all radio modems and fixed terminals (FSTs), such as hosts and gateways, must have an active Mobitex Access Number (MAN). A MAN is assigned to every user subscribing to the Mobitex network; it is analogous to a telephone number. The MAN for a mobile user is stored in the mobile's radio modem, just as a telephone number is stored inside a cellular phone. MCP/1 ("Mobitex Compression Protocol 1") is a set of optional compression protocols used by the radio modem to enhance throughput. MTP/1 ("Mobitex Transport Protocol 1") is a tested and standardized transport protocol that ensures packets are transmitted over Mobitex in order, and without loss (akin to TCP/IP). Data to be transmitted over Mobitex is broken up into Mobitex Packet or "MPAKs" (maximum size 512 bytes). Packets of data are assembled and transmitted with header information respecting the sender, addressee, and the type of data. The body contains the application data to be sent or received. To improve speed and reduce the cost of communication, the radio modem may compress the packet data before transmission.

Analogous to land-based telephone systems or dial-up Internet connections, circuit-switched communications require the establishment of a dedicated connection to be made between two parties prior to any data transfer. Once this connection has been made, the circuit (or frequency in the case of wireless communication) is tied up for the duration of the session.

Analogous to land-based Ethernet connections, a packet-switched wireless network involves the sharing of a single frequency between users. Only one user may transmit or receive at a given instant since packet networks cannot multiplex. Since only small packets of data are typically being transmitted, this scheme is ideal for many applications. Unlike circuit-switched systems, the packet-switched approach allows devices to remain continuously connected to the network, making instantaneous access and two-way paging possible. The RIM Blackberry uses this approach through a Base Radio Unit Network "BRU3", a single channel mini base station for Mobitex networks. The BRU3 can achieve temporary coverage demands for new traffic situations such as at trade shows, sport events etc. A capacity of more than 1,500 users per base station reduces bottlenecks. End-users can send an email in seconds, transmit vehicle positions in less than two seconds, and verify a credit card transaction in less than five seconds.

The applicant's prior product "SonicAdmin" applies open standard security such as "Data Encryption Standard" or triple DES (a DES operation that takes three 64 bit keys, for an overall key length of 192 bits) in a proprietary way using 1 key (rather than 3 separate keys) together with code that is stored in a DLL. A User enters a 192 bit (24 character) key that SonicAdmin breaks into 3 sub-keys, padding the sub-keys so they are each 64 bits long. The procedure for encryption is the same as regular DES, but it is repeated three times. The data is encrypted with the first sub-key, decrypted with the second sub-key, and finally encrypted again with the third sub-key. Consequently, the Triple DES of SonicAdmin is slower than standard DES, but, if used properly, it is more secure.

Known conventional technologies for administering networks wirelessly include those accessed through a web browser, using a standard micro-browser client/application running on any of a variety of PDAs, pagers, data capable cell phones or other Wireless Input Devices ("WIDS") to access a web-server connected to the LAN or other network of Managed Entities whether in hardware or in software (including: servers, routers, desktops, modems, printers, switches, mainframes, serial or parallel devices, pagers, data capable phones, applications, services, or processes). These traditional approaches take advantage of existing infrastructure to provide an inexpensive and flexible (i.e. client WIDs need not be prepared or have client software loaded) way to access Managed Entities, but disadvantageously increase the risk of unauthorized access to the LAN or Managed Entities through the web-server component of the service, a risk that is not acceptable to many organizations.

Wireless Transport Layer Security (WTLS) is based on Transport Layer Security (TLS) (similar to Secure Sockets Layer, SSL), WTLS was developed to address the problems of mobile network devices, including: narrow bandwidth, high latency environment, limited processing power and memory capacity. TLS was modified to address the needs of wireless users because radio networks do not provide end-to-end security. TLS is a protocol that is the successor to SSL. TLS has two layers: the TLS Record Protocol and the TLS Handshake Protocol. The Handshake Protocol allows the server and client to authenticate each other and to negotiate an encryption algorithm and cryptographic keys before data is exchanged. The Record Protocol provides session security using a particular method of encryption such as the DES, but can be used without encryption. TLS and SSL are not generally interoperable, but TLS can export data streams in a form suitable for use by SSL infrastructure.

Wireless Application Protocol ("WAP") uses a specially developed protocol stack to implement the part of the wireless transmission from a WAP client device to a WAP Gateway. The WAP architecture replaces the current web server technology for the portion of data communication between a wireless device and the web server. A WAP Gateway implements the Internet protocol stack on behalf of the WAP client device. The WAP Gateway is a Service Enabling Platform. The Wireless Application Protocol (WAP) is a specification for a set of communication protocols to standardize the way in which mobile phones and wireless devices can access the Internet. The WAP concept provides the mobile network operator with a powerful environment for offering subscribers value-added services that will boost the usage of data. The WAP Gateway is an entry point for mobile users to the Internet. It provides protocol mapping between IP and WAP protocols, encoding and decoding for efficient data transfer and mobile access. Requests from the mobile devices are sent in the form of wireless mark-up language (WML) commands to the WAP Gateway. The WML request is converted into hypertext mark-up language (HTML) and sent over HTTP to the Internet application server. The WAP Gateway software is comprised of two parts: the basic gateway and the enhanced services. With this technology in place, Internet information can be developed and displayed on mobile devices, allowing users to access the Internet from almost anywhere. This provides the mobile user with services such as infotainment, flight schedules, weather forecasts, stock exchange information, e-commerce, etc. WAP features include:

- WAP serves as proxy that fetches the requested data from Internet sites
- Protocol mapping between the Internet standard and WAP protocol
- Access to mobile data bearers
- Encoding/decoding for efficient transfer between data bearers
- Subscriber administration and Service management
- Dynamic Configuration Data Support
- User Agent Profiling Standardized format and protocols
- Support of wide range of mobile terminal types Since TCP/IP is not used for communication between the WAP client and the WAP Gateway, SSL or TLS could not be used to implement the security. WTLS can sustain the low bandwidth, high latency transport layer and is derived from TLS by removing the overhead where possible without compromising security that makes the protocol suitable for the wireless environment. Like TLS, WTLS operates on top of the wireless transport layer also known as WDP, and below the session layer known as WSP. However, WTLS runs on top of an unreliable datagram service, and not a reliable transport protocol like TCP/IP, creating reliability concerns respecting message exchanges across several WTLS operations. WTLS also uses digital certificates to provide for server or client side authentication, but due to the memory limitation of WAP devices certain desirable attributes are omitted from the digital certificate specifications, including the Serial Number and Issuer ID fields. A WAP Gateway is responsible for the translation of messages from one protocol to another. Just like it encodes text based WML content into binary WML format before sending, it has to decrypt TLS encoded messages, convert the content into binary format, encrypt it using WTLS and then send. The same happens when the message arrives from the WAP device. It must be decrypted, decoded and the resulting WML re-encrypted using TLS specifications and then forwarded to the applications server. Consequently, the WAP Gateway sees all messages in clear text, including messages intended to be confidential throughout the transmission are exposed for a split second, and that is what is known as the WAP Gap, which can be addressed by setting up an internal WAP Gateway accessible only by Users of the application and configuring devices to use the new gateway for access to WAP content. Although some WAP devices support multiple gateway configurations, switching between them as the users navigate from one application to another is difficult. Most companies that deploy an end-to-end secure solution require their users to carry phones with pre-set gateway configurations and access to WAP applications hosted on their servers only.

The web protocol used to communicate between the web-server and the micro-browser depends on the type of WID deployed. Some WIDs are capable of handling HTML such that they can be used for "direct access" to the web-server. Other WIDs are designed or setup to handle the more compact WML, such that, although their speed of operation is higher, they must access the web-server through a WAP Gateway making them subject to the WAP Gap. Some conventional web-server implemented wireless services operate without encryption, while others use generic forms of encryption such as SSL or TLS, or deploy a $3^{rd}$ party VPN security product to connect the service to the necessary web-server. Various wireless input devices are known to run a generic micro-browser the output for which is in WTLS, communicating by radio means, typically a cellular network, through an IAS Server that authenticates the wireless user who is provided with access to the Internet, through a WAP gateway that must convert from WTLS to TLS before transfer over the Internet, to a web-server that is relatively exposed to attack because Port 80 remains "open" in order for a web-server to be accessible round the clock for requests from unknown sources, and by virtue of which crackers have a point of access to anything logically connected to web-servers. Use of such system to provide LAN Admin services is necessarily risky because the web-server must have access to the LAN in order to pass Admin instructions from a WID to any server on that LAN. It is therefore desirable not to use a web-server for network administration applications.

Proxy technology is well known in the computing industries as a means to reduce the number of points of access by or to a LAN from the Internet. For example, commonly, proxy technologies are used as a "gateway" permitting client devices that are "sealed off" from the Internet a trusted agent that can access the Internet on their behalf, such gateway often running with a firewall positioned as a barrier to crackers. In the case of a proxy gateway the proxy technology has been applied as a "stand-in" or "proxy" for the client. In another example of a common use for proxy technology the "proxy" is applied for a server wherein caches of files that are popular are loaded onto a proxy server to fill requests for files originally from a machine that may be slower or more expensive to operate. In both cases, the true concept of proxy technology is based on a machine that actually does something on behalf of another machine, unlike a router that merely makes connections between end points permitting those machines to conduct their own affairs.

It is known that intermediate servers operating as routers eliminate the use of a web-server and the WAP gap. However, even these newer technologies suffer a number of disadvantages. For example, such newer conventional means for wireless network admin rely on the generic, industry standard SSH protocol and its security layer SSL both of which are vulnerable to unauthorized access, including by "crackers".

Further, SSH is interpreted character by character causing a large volume of data transfer and work on the client WID interpreting messages sent using the SSH protocol, neither of which is desirable in the narrow-bandwidth, low capacity world of portable computing devices. Similarly, SSL can only run on an SSL enabled WID and requires that security operations (as well as device management, and service functionality) be performed by the Managed Entity (e.g. a server on the LAN having business processes that it must run and that are thereby already consuming processor power or other system resources) running the SSH service. Consequently, even though some conventional SSH technologies include a machine intermediate the firewall and the LAN, that machine is restricted to operate as a router rather than as a true proxy, since its purpose (even though it may be implemented with some gateway functionality) is to provide a single point of entry through the firewall eliminating the need for a different port in the firewall to be opened for each Managed Entity requiring access to WID's outside the firewall.

Authentication is the process of attempting to confirm whether an entity (e.g. a device such as a WID or a User) is, in fact, what or who it has been declared to be. Authentication is commonly done using identifier (e.g. user name) password combinations, the knowledge of which is presumed to guarantee that the user is authentic. Each user's password is initially registered providing a measure of verification, however passwords can thereafter be stolen, intercepted, accidentally revealed, or forgotten. The more levels of authentication, the higher the level of confidence that the entity successfully providing all "keys" is authentic. Authorization is the process of confirming that an entity has permission to do or have something, for example, to give certain commands or to access to specific Managed Entities (e.g. servers) or files. A person of skill in the art would understand that authorization may take place at any or all of the network operating system (NOS), computer operating system (OS), or application levels. Logically, authentication precedes authorization although they may often appear to be combined.

Typically authentication takes place without encryption the keys for which may be negotiated once the host confirms the identity of the entity being authenticated. Typically authentication is carried out for the User alone and not for the device, which in the context of mobile devices has the disadvantage of permitting stolen devices to remain a threat against which there is no direct protection. It is therefore desirable to engage authentication means respecting mobile input devices. A hardware element commonly referred to as a "dongle" that generates a unique identifier (i.e. a string of characters) specific to that particular dongle—is one known means for uniquely identifying devices. To add an additional layer of security a system can require a unique identifier generated by a dongle (in addition to a user ID and password), such that parties not in possession of that dongle cannot produce the required unique identifier. The MAC address of a PC network card, or a unique identifier from a computer hard drive may similarly be used to separate the user from the device. Consequently, if a user loses a WID that device may be locked out of the system such that someone finding it preloaded with the appropriate software would not be able to access the system and then simply keep trying to guess the appropriate user ID/password combination. Advantageously, at the same time the user is not locked out, so he or she can continue to access the system from a valid WID or PC. Cell phones similarly have unique identifiers, associating each device with a particular account, which identifiers can be used to prevent lost or stolen cell phones from accessing the cellular network. A user can contact their carrier to disable the subject account rendering the associated cell phone inoperable. With the proper knowledge a cell phone can be re-activated by changing the SIM card requiring a different cell phone number, but there are even measures in place to protect against this form of cell phone fraud.

Integrity, in terms of data and network security, is the assurance that information has only been accessed or modified by persons authorized to do so. Common network administration measures to ensure data integrity include the use of checksums to detect changes to file content.

TLS is replacing SSL, in the OSI Transport Layer, as the industry standard for encryption when using TCP/IP to move packets securely across the Internet. Since most web content development now contemplates broadband access, in order to enhance performance on low power, limited capacity, narrowband wireless devices, WAP has evolved as a subset of rules permitting wireless devices to more efficiently access such graphics heavy content. WML (Wireless Markup Language) is a set of Presentation Layer commands based on XML and HTML, intended for use in specifying content (and a scaled down user interface) for narrowband devices for which reduced graphic content is appropriate. WTLS is available for use as the Transport Layer standard of generic security during the "wireless leg" of transmissions between a client and a managed entity, however WTLS is not required for carrier dependent transmission to occur, which various implementations of WDP achieve without encryption being applied at the socket level. For example, a simple wireless device sending public information not needing to be encrypted could be used to send presentation instructions written in HTML to a web-server for display. The characters comprising the HTML would be processed for transmission in accordance with the radio carrier's particular radio network (and WDP) on the other end of which radio network they would be "de-processed" in preparation for uploading to "run over" TCP/IP across the Internet, without security. In the more common example of a sensitive message originating on a wireless device, characters written in WML (but they could be in HTML) would be encrypted at the socket level (as opposed to by the client application per se) using (generic) WTLS and then also processed in accordance with the carrier's particular radio network for transmission over the wireless portion of the journey to the message's destination. Upon reception at the radio carrier's tower, the message must be de-processed from the earlier radio network specific processing—and then also decrypted from WTLS (for conversion to TLS), since current technologies do not permit WTLS encrypted packets to be sent over the Internet on TCP/IP. Decryption from WTLS takes place on a WAP Gateway (typically supplied by an Internet carrier) that is inherently "public" in nature. It is during the time between the decryption from WTLS and re-encryption to TLS that a "gap" in security occurs that has become known as the "WAP gap". During the interstitial period the characters in WML would sit in an unencrypted form on the WAP Gateway exposed to "sniffers" or other tools used by crackers to "listen" to known weak points in the Internet for subject matter of interest. Even though TLS and WTLS are "strong encryption" options, neither of them is necessary if an alternate means of security has been implemented to avoid the WAP gap. It is therefore desirable, particularly for network administration applications, to transmit information and commands using a system that does not rely on WTLS alone for security.

An application programming interface" ("API") is the set of calling conventions by which an application such as a network administration client accesses the operating system ("OS") and other services. There are currently 3 conventional programming interfaces that permit network operators to access Windows operating systems for the purpose of providing administrative commands to managed entities: WIN32, ADSI and WMI (CIM). Conventional remote administration technology delivers commands (e.g. reboot), through a web-server, using these interfaces directly to the managed entity that executes without further enquiry—such that a risk of the unauthorized deliver of such commands exists. A person of skill in the art would understand that various of these may be implemented as a Device Driver rather than a memory-resident program.

There are currently 3 main problems associated with using wireless technology to remotely administer a computing network. First, the need to transmit signals through unsecure media, such as radio frequency transmission, creates a security problem because the signals are susceptible to interception. Second, the narrow bandwidth of current input device technology (e.g. pagers, PDAs, phones) makes data exchange slow. Third the fragile connectivity of current radio communication networks makes data exchange unreliable. Both slow and unreliable data exchange are severe practical limits on the administrative services deliverable.

To reduce the amount of data being transferred between a WID and its server, one conventional approach is to store more (LAN) information on the WID, which disadvantageously creates a serious security risk to the LAN in the event that the highly portable WID is stolen. It is therefore desirable to provide a solution that requires neither extensive transfers nor the storage of LAN data. Further, conventionally, authentication takes place without encryption—the keys for which encryption may be negotiated once the host confirms the identity of the entity being authenticated. Authentication is also traditionally carried out for the User alone and not for the device, which in the context of mobile devices has the disadvantage of permitting stolen devices to remain a threat against which there is no direct protection. It is therefore desirable to engage authentication means respecting the mobile input devices as well.

As remote devices attempt to communicate with such a LAN there will periodically be failures of various elements including servers that permit such communication. Consequently, there are "fail-over" technologies for minimizing the disruption of access. For example, Microsoft Windows 2000 Advanced Server has a "clustering agent" to enable and configure clusters that bind several servers to appear as one physical machine, the benefits of which include load balancing as well as fail-over protection. Two users accessing a web-site at the same time may be talking to 2 separate physical machines although it will appear they are at the same location (load balancing). And, if a physical machine in a cluster becomes inoperable the software will automatically remove it from that cluster to prevent users accessing an inoperable machine (fail over). The foregoing is a software solution, although some physical hardware is required the "clustering agent" is not tightly bound to hardware. According to a Hardware approach, the software required is tightly bound to hardware such as is the case with the Cisco 7200 series router that will fail-over to alternate IP (Internet Protocol) based technologies such as: Fast Ethernet, Gigabit Ethernet, or Packet Over Sonnet that are all proprietary embodiments of the internet protocol and are for use with proprietary hardware, only some of which use a different physical medium (e.g. fibre-optic cable) constituting a different point of access to the internet—rather than a different mode (e.g. a telephone line used for direct-dial between 2 modems). Although the Cisco example involves different communication technologies that are IP-based, the mode of communication is still the internet. For example, Packet Over Sonnet technology is used for connecting high-speed IP-based networks to the internet via optical fiber. Although using a different medium of access, resulting in a different point of access, the fail-over operation of the Cisco 7200 series router is between technologies that all use the internet mode—rather than from the internet to a different mode. Neither is the use of internet protocol determinative of mode, since IP may be used to communicate over non-internet networks. Also, the use of a non-IP-based protocol in any portion of the communication path is not determinative of whether the primary mode is the internet. For example, X25 uses a network layer protocol called PLP, although similar to IP, X25 technology has separate hardware and protocols used for passing the data. It is very common to pass information from one IP-based network to another over a high-speed X25 trunk using hardware to convert between IP and PLP on both transmit and receive ends. Cisco routers may be configured to run X25 to enjoy the advantage of a direct high-speed connection between devices each of which otherwise use IP on a LAN and to communicate remotely using the internet. However, if the X25 connection goes down—no alternate mode of communication is attempted. And, there are no known systems, for the delivery of messages, offering a group of alternate modes when the internet or other primary mode is down. Conventional systems using alternate modes of communication would be limited in any event by the lack of compatibility of the different available infrastructures and protocols. It is desirable therefore to have a method for delivering messages, which method takes advantage of devices suitable for switching between different modes of communication.

In emergent circumstances, disadvantageously, without the rapid availability of alternate modes of communication, the opportunity to gain access to certain networks and the devices included in them may be lost. Therefore it is desirable to have a method and system pre-configured to access at least one backup mode of communication with important networks.

Conventionally, test transmissions like the Packet InterNet Groper or "ping" are sent to an external source to test access to devices by sending them one or more, Internet Control Message Protocol ("ICMP") echo requests and waiting for replies. Since "pinging" works at the IP level its server-side may be implemented within the operating system kernel making it the lowest level test of whether a remote host is alive, such that pinging is often effective even when higher level, TCP-based, services cannot. Also, the Unix command "ping" can be used to measure round-trip delays in case the primary mode, although operational, is congested. ICMP is an extension to the Internet Protocol (IP) that allows for the generation of error messages, test packets, and informational messages related to IP.

The applicant's U.S. application Ser. No. 10/326,226 discloses a proxy method, messaging protocol, and a robust but flexible security model that are suitable for use securely delivering messages with such a system for switching between different modes of communication.

SUMMARY OF THE INVENTION

There is provided a novel system and method for delivering messages using alternate modes of communication. The circumstances in which the system of the present invention operates are typically emergent resulting from disaster whether natural or man-made. Terrorist activities for example may result in the destruction of or damage to communications infrastructure such as fibre-optic, other cables, or other elements in the Data Link or Physical layers used to deliver messages across the Internet. Since it is unlikely that all modes of communication will be disabled at once in such an attack, it is desirable to have easy access to alternate modes as well as to means for determining which of those modes remains enabled and accessible. The method of the invention takes advantage of devices suitable for switching between different modes of communication during periods when the internet or other primary mode is down.

The term mode is used herein to distinguish between different "channels" and different "implementations of IP-based communication" at the Network Layer. What is intended is that regardless of how the data stream is multiplexed or encoded, it is transferred along a different path that is more than the "re-routing" that is basic to ordinary Internet transmissions.

If during the period that the primary mode of communication is not available the switching Agent detects a signal from an alternate, then the message processor may respond with its normal authentication and authorization sequence. In the present example, during the period of interruption of the primary mode, the message processor may continue to process commands received from the WID—until the primary mode is confirmed restored, upon which a mode change sequence (not terminating the current session) is executed between the devices. In the event that the secondary mode also fails, then a tertiary mode, or a quaternary mode could be initiated. For high security applications, a rolling sequence of mode changes could be implemented until the primary mode is restored, for a session then in progress.

A person of skill in the art of electronic communication would understand that in emergent circumstances a Wireless Internet Service Provider ("WISP"), such as FatPort, may be used as an alternate point of access to the same (internet) mode if the local backbone remains in tact.

According to the system aspect of the present invention, there is provided a system for delivering a message using a primary mode of communication between a remote input device and a managed entity, the system comprising: at least one alternate mode of communication; adaptor means for said remote input device to access said at least one available alternate mode of communication said adaptor means activated upon determining that said managed entity is not responsive to said message transmitted using said primary mode of communication to commence transmitting said message using said at least one available alternate mode of communication; switching means for said managed entity to access said at least one available alternate mode of communication; and means for detecting loss of access by said managed entity to said primary mode of communication; whereby, upon said means for detecting loss of access determining that said primary mode is not available for said managed entity to receive said message, said switching means permits the receipt by said managed entity of said message using said at least one available alternate mode of communication.

According to the system aspect of the present invention, there is provided a system for delivering a message using a primary mode of communication from a remote input device, having means to monitor an external source for the purpose of detecting loss of access to said primary mode of communication, the system comprising: at least one alternate mode of communication; and adaptor means for said remote input device to access said at least one available alternate mode of communication said adaptor means activated upon detecting loss of access to said primary mode of communication to commence transmitting said message using said at least one available alternate mode of communication.

According to the system aspect of the present invention, there is provided a system for receiving a message using a primary mode of communication on a managed entity, having means to monitor an external source for the purpose of detecting loss of access to said primary mode of communication, the system comprising: at least one alternate mode of communication; and switching means for said managed entity to access said at least one available alternate mode of communication said switching means activated upon detecting loss of access to said primary mode of communication to commence listening for said message using said at least one available alternate mode of communication.

According to the system aspect of the present invention, there is provided a system for delivering a message using a primary mode of communication from a remote input device, having means to monitor an external source for the purpose of detecting loss of access to said primary mode of communication, the system comprising: at least one alternate mode of communication; and adaptor means for said remote input device to access said at least one available alternate mode of communication said adaptor means activated upon detecting loss of access to said primary mode of communication to commence transmitting said message using said at least one available alternate mode of communication.

According to the system aspect of the present invention, there is provided a system for receiving a message using a primary mode of communication on a managed entity, having means to monitor an external source for the purpose of detecting loss of access to said primary mode of communication, the system comprising: at least one alternate mode of communication; and switching means for said managed entity to access said at least one available alternate mode of communication said switching means activated upon detecting loss of access to said primary mode of communication to commence listening for said message using said at least one available alternate mode of communication.

According to the method aspect of the present invention, there is provided a method for delivering a message between a remote input device and a managed entity, for use when loss of access by either said remote input device or said managed entity to a primary mode of communication has been detected, comprising the steps: enable at least one alternate mode of communication; activate adaptor means to and transmit said message using at least one of said at least one alternate mode of communication; and activate switching means to permit the reception of said message using at least one of said at least one alternate mode of communication.

According to the method aspect of the present invention, there is provided a method for delivering a message between a remote input device and a managed entity having at least one alternate mode of communication pre-enabled, for use when loss of access by either said remote input device or said managed entity to a primary mode of communication has been detected, comprising the steps: select at least one alternate mode of communication; activate adaptor means to and transmit said message using at least one of said at least one alternate mode of communication; and activate switching means to permit the reception of said message using at least one of said at least one alternate mode of communication.

According to the method aspect of the present invention, there is provided a method for delivering a message between a remote input device and a managed entity, in accordance with an Alternate Mode Sequence comprising a plurality of rules respecting when to switch between alternate modes of communication as well as which of said alternate modes of communication to switch to, for use when loss of access by either said remote input device or said managed entity to a primary mode of communication has been detected, comprising the steps: reference said Alternate Mode Sequence to identify a secondary mode; activate adaptor means to and transmit said message using said secondary mode; and activate switching means to permit the reception of said message using said secondary mode.

According to the method aspect of the present invention, there is provided a method of using a switching agent for enhancing security when delivering a message between a remote input device and a managed entity each having access to a plurality of alternate modes of communication M1, M2, M3, M4, comprising the steps: send and receive request for communication using M1; use M2 to send and receive reply to said request for communication using M1; send and receive further request for communication using M3; and use M4 to send and receive reply to said further request for communication using M3.

According to the method aspect of the present invention, there is provided a method of using a switching agent together with a shared synchronized random number generator for enhancing security when delivering a message between a remote input device and a managed entity each having access to a plurality of alternate modes of communication MX, MY, MZ, MK, comprising the steps: send and receive request for communication using MX; generate a random number shared by said remote input device and said managed entity for the purpose of selecting the alternate mode of communication that is MY; use MY to send and receive reply to said request for communication using MX; generate a random number shared by said remote input device and said managed entity for the purpose of selecting the alternate mode of communication that is MZ; send and receive further request for communication using MZ; generate a random number shared by said remote input device and said managed entity for the purpose of selecting the alternate mode of communication that is MK; and use MK to send and receive reply to said further request for communication using MZ.

According to the method aspect of the present invention, there is provided a method for delivering a message consisting of a plurality of packets between a remote input device and a managed entity each having a plurality of alternate modes of communication all of which modes are enabled, for the purpose of making it difficult to intercept all said packets of said message, comprising the steps: compose said message so as to comprise X blocks of packets; select a first alternate mode of communication from said plurality of alternate modes; use said first alternate mode of communication to transmit Y blocks of packets where Y is less than X; select a second alternate mode of communication that is not said first alternate mode of communication; and use said second alternate mode of communication to transmit the remaining X-Y blocks of packets that were not included among said Y blocks of packets.

According to the method aspect of the present invention, there is provided a method of sending a message from a remote input device, for use when there is a loss of access to a primary mode of communication, comprising the steps: activate adaptor means to and transmit said message using at least one alternate mode of communication; and activate switching means to permit the reception of said message using at least one of said at least one alternate mode of communication.

According to the method aspect of the present invention, there is provided a method of receiving a message on a managed entity, for use when there is a loss of access to a primary mode of communication, comprising the steps: activate switching means to permit the reception of said message by said managed entity using at least one alternate mode of communication.

The accompanying drawings, which are incorporated in and constitute a part of this specification, illustrate preferred embodiments of the method, system, and apparatus according to the invention and, together with the description, serve to explain the principles of the invention.

BRIEF DESCRIPTION OF THE DRAWINGS

The present invention, in order to be easily understood and practiced, is set out in the following non-limiting examples shown in the accompanying drawings, in which.

DETAILED DESCRIPTION OF THE PREFERRED EMBODIMENT

Reference is made to FIGS. 1-6 in which identical reference numbers identify similar components.

Figure 1:
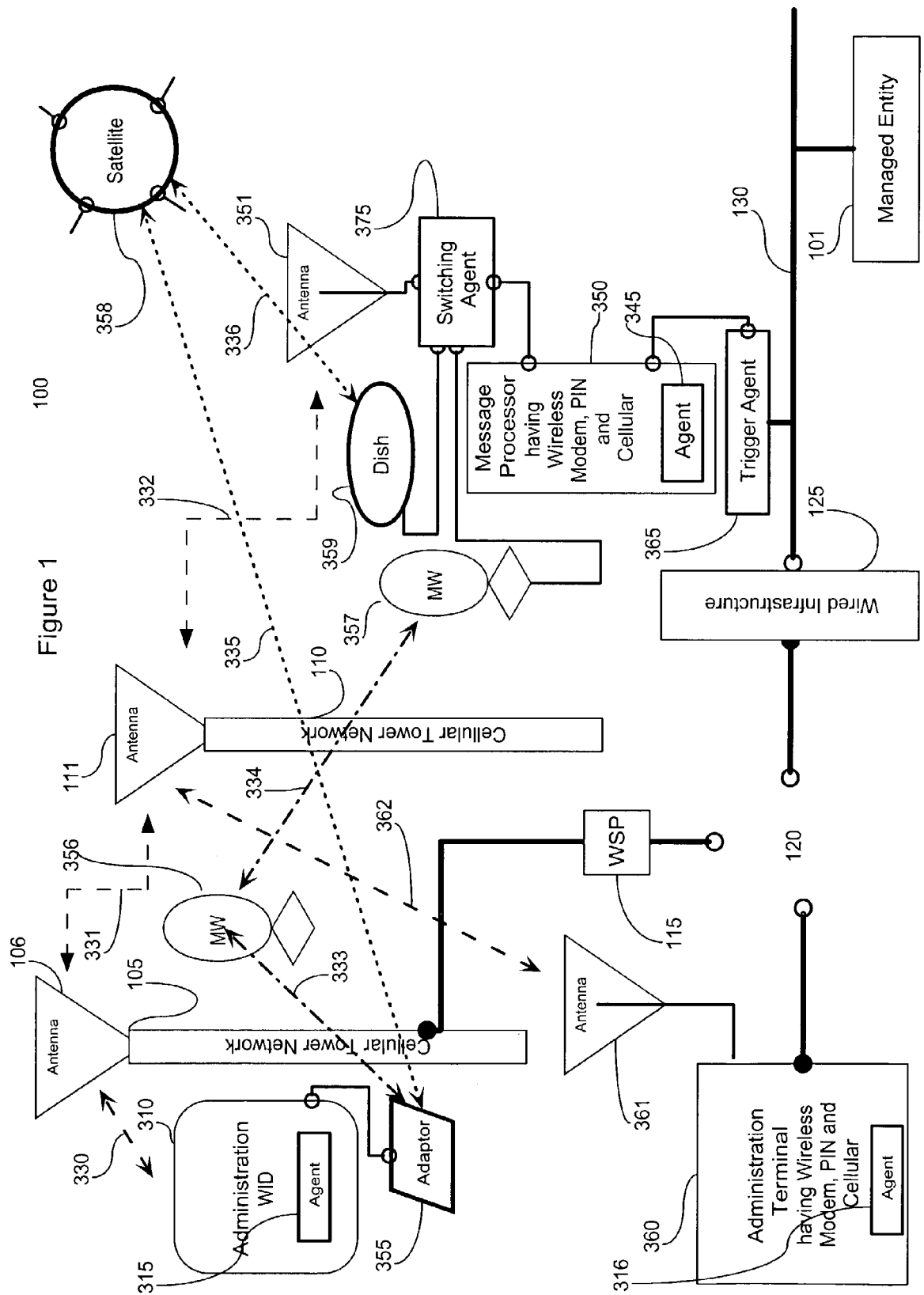
FIG. 1 is an illustration of a preferred embodiment of the system of the present invention according to which the triggering and switching agents operate through a Proxy and the WID and the Terminal communicate wirelessly, the WID having cellular, microwave and satellite alternate modes enabled.

Referring to FIG. 1, there is illustrated an embodiment of the system of the invention including novel elements 355, 365 and 375 operating on and in cooperation with several known elements.

The circumstances in which the system of the invention operates are typically emergent, when for some reason Proxy 350's access to messages from wireless input device (WID) 310 has been interrupted from its primary mode of communication (here the Internet) on bus 130. Access to the primary mode may be interrupted by a physical break 120 in the connection to the Internet (such as may occur in a terrorist attack) or by the failure of a range of other elements (such as may occur through various types of denial of service attacks) that together comprise the wired infrastructure 125 through which Proxy 350 bi-directionally communicates with a variety of authorized devices including, for example, but not in limitation, terminal 360 and WID 310. In normal circumstances WID 310 communicates through cellular tower 105 and antenna 106 combination directly to a Wireless Service Provider 115 having access to the Internet—lost in the present sample scenario due to physical break 120. However, as one example of an alternate mode of communication WID 310 may use a modem (internal or external) and telephone line (not shown) to dial-in to another modem either directly or through transception adaptor 355.

The system denoted generally as 100 comprises any WID 310 capable of using multiple modes of communication. WID 310 has loaded thereon client application Agent 315 that accepts input and assembles encoded messages according to a messaging protocol and security model. In the present example, Agent 315 executes all appropriate processing necessary to transmit a message so encoded via radio wave 330 through a conventional radio network consisting of towers 105 and 110 respectively having antenna means 106 and 111 for relaying radio wave 331 and delivering radio wave 332 to antenna 351 connected to switching agent 375 connected to message processor Proxy 350. Proxy 350 responds to the message carried in radio wave 332 in accordance with a set of rules for rejecting or accepting instructions received using the alternate modes accessible through switching agent 375. These rules also deal with when to switch between alternate modes of communication as well as which of those alternate modes to switch to. The set of rules is any suitable Alternate Mode Sequence ("AMS") 376 that defines which alternate modes are available, in what order to access them, how to determine when to attempt to access a different mode, how to determine when to return to the primary mode after it has been restored, and more. The AMS may for further example require a system to switch to an alternate mode if messages are not received at all or for a definable period of time, or if a number of packets or messages are not acknowledged as being received, or if a transmission fails to achieve any one or more of a number of quality of service criteria, which may for example include metrics relating bandwidth, jitter, latency, or excess noise (SNR). The AMS may further include a requirement to periodically poll each of any pre-enabled alternate modes to confirm their accessibility or otherwise determine their state of readiness. The AMS may use such current data respecting state of readiness and performance metrics to preclude particular pre-enabled modes from being used in emergent circumstances unless the subject modes meet or exceed a variety of quality of service or other performance criteria.

Trigger Agent 365 (e.g. a separate device or a module of Agent 345) may be connected to the incoming Internet signal line (e.g. bus 130) at any point that permits monitoring Internet availability in response to the loss of which it triggers Proxy 350 to commence "listening" (by any suitable means), perhaps in a pre-defined priority sequence, on one or more of its alternate modes. One rule in the AMS could be: In circumstances "X", accept a message containing the "Execute Emergency Shutdown Sequence" command, and comply immediately, regardless of the alternate mode by which the message containing that specific command is received after circumstances "X" arise. Similarly, if during the period that the primary mode of communication is not available switching agent 375 detects a signal on an alternate mode (e.g. signal 330 sent to it via a direct connection initiated by Agent 315), then Proxy 350 may respond with its normal authentication and authorization sequence. In the present example, during the period of interruption of the primary mode, Proxy 350 may continue to process commands received from WID 310—until the primary mode is confirmed restored, upon which a mode change sequence set out in the AMS (not terminating the current session) is executed between WID 310 and Proxy 350 to switch back to the primary mode. Alternatively the alternate mode(s) may be used until the session ends. In the event that the secondary mode (e.g. radio through 351) M2 also fails, then a tertiary mode (e.g. microwave through 357) M3, or a quaternary mode (e.g. satellite through 359) M4 could be initiated. For high security applications, the AMS may also include a rolling sequence of mode changes (set out in greater detail below), which sequence could be implemented throughout a session in progress or until the primary mode is restored.

A person of skill in the art of backup communication would understand that the number and content of the particular rules in an AMS varies from system to system, but is normally based on the importance of access to the particular managed entities, in the different emergent circumstances. It is further contemplated that the AMS may be burned into a chip, hard-coded into software, integrated into Agent 315, stored in a table or a database for ease of adjustment, or otherwise made available to switching agent 375 in any suitable form by any suitable means.

A simple embodiment (not shown) is also contemplated according to which no AMS or other group of rules is required—for example, within 20 seconds after an external source fails to respond to an access test, switching agent 375 switches Proxy 350 over to satellite mode where it remains, and within 15 seconds of not receiving a reply to a message requesting a session WID 310 independently uses transception adaptor 355 to send that resend that request using satellite mode, then after establishing a session WID 310 and Proxy 350 agree to direct-dial or another alternate mode to exchange certain types of messages and their responses.

Typically high-priority networks that include managed entities will have highly reliable, alternate modes enabled and will switch between those modes more quickly with less emphasis on switching back to the primary mode as soon as it is available, in order to avoid the risk of again losing communication with the managed entities. In the context of intermittent communication, in some emergent circumstances and for administrative applications it is desirable to maintain a session between devices, which can be achieved by having a series of data packets share a unique token or identifier so that regardless of which of the alternate modes a packet is received on, the devices can treat the subject group of packets as a single session.

According to a preferred embodiment WID 310 is any suitable multi-mode capable device having a plurality of wireless communication modes (e.g. cellular, FM radio, infrared, laser, microwave, satellite, UHF) from which either an operator (not shown) or Agent 315 may select an available mode. A person of skill in the art would understand that multi-mode capacity may be embedded in WID 310 or attached thereto as peripheral transception adaptor 355 through a USB port or other suitable access to WID 310, or via a combination of embedded and peripheral technology. Depending on which alternate mode is selected the antenna (not shown) in or on WID 310, or in or on its transception adaptor 355, may have to be changed. Transception adaptor 355 will process signals in a manner suitable to the mode of communication selected at a given point. Similarly switching agent 375 will, if required, reprocess the signals into their native format suitable for handling by Proxy 350 or by managed entity 101.

If an operator is using WID 310 to communicate with Proxy 350 in cellular mode the particular instance of which mode is normally linked to a Wireless Service Provider ("WSP") who can provide a connection to the Internet, the fact that intermediate elements WSP 115 and tower 105 may, despite emergent circumstances, still be in operation is insufficient—such that upon determining, by any means, that the pathway between WID 310 and Proxy 350 using the primary mode, is not functional—Agent 315 initiates, for example, a direct connection passing through tower 110 and antenna 111 for transfer through antenna 351 to Proxy 350, rather than passing through normal infrastructure 125. Further, in the event that no instance of cellular mode is functional, the operator of WID 310 (if manually selecting) or its Agent 315 may upon querying an operator, or in accordance with an AMS available from a database or otherwise, select microwave as the alternate mode of communication, such that microwave signal 333 may be transmitted by transception adaptor 355 to microwave relay 356 and forwarded as signal 334 to microwave transceiver 357 connected to switching agent 375 for consideration by Proxy 350 before transfer via bus 130 to Managed Entity 101. Similarly, if satellite were the alternate mode selected, then satellite signal 335 may be transmitted to any suitable satellite 358 for relay as signal 336 to terrestrial dish 359 connected to switching agent 375 for consideration by Proxy 350 before transfer via bus 130 to Managed Entity 101.

In accordance with the AMS, switching agent 375 permits Proxy 350 to communicate via different modes and switch between those modes that are both enabled and accessible at a given point in time. Interruption of the primary mode M1 may, for example, be defined in the AMS as the inability of Proxy 350 to connect to external IP address XXX.XXX.XXX.XXX over a period of Y units of time (e.g. 1 minute), after which M2 (e.g. Mobitex) is automatically enabled (if not pre-enabled) and its accessibility is verified, which is defined in the AMS by making a successful connection to an external device responding to MAN number ZZZZZZZZ. If a connection to the subject Mobitex device cannot be established using M2 over a period of Y units of time then, M3 (e.g. Satellite) is similarly to be enabled and its accessibility verified by establishing a link with satellite W, et cetera. Once at least one alternate mode of communication is enabled and its accessibility is verified, one or more sessions can continue contemporaneously with periodic attempts (e.g. every 5 minutes) to re-establish connection via primary mode M1. A person of skill in the art of emergency communication would understand that the rules of the AMS may further include notifying administrative people and devices that a disruption of primary mode M1 has been detected, tracking and logging the disruption(s), and notifying such people and devices when primary mode M1 has been restored. A variety of protective actions (e.g. lock-down) relating to Proxy 350 or to its managed entities may also be triggered in relation to changes in the availability of access to primary mode M1. The above functionality to detect the loss of access to primary mode M1 may installed on either or both ends of the communication path, such that either WID 310 or Proxy 350 or both devices may monitor for change in access to primary mode M1. According to a preferred embodiment a $3^{rd}$ device such as trigger agent 365 independently detects loss of access to primary mode M1. It is also contemplated that other independent devices and degradations in the performance of primary mode M1 resulting in less than full access to primary mode M1 may be used to trigger switching to an alternate mode of communication. Any combination of devices sensing and sharing information respecting the status of access to primary mode M1, which results in the communicating devices (in the present example, WID 310 and Proxy 350) all sharing at least one alternate mode simultaneously can be effective for the purpose of switching modes. A variety of sensing or monitoring devices may be used to detect loss of access to primary mode M1 (whether land-line telephone, internet, cellular or other depending on the industry and the application) or the presence of causes that result in such loss. Regardless of the nature of the event so detected, such events may be used to trigger activity that in appropriate circumstances leads to switching between the enabled and accessible modes of communication.

Terminal 360 would similarly use an alternate mode to communicate with Proxy 350 when an event such as a physical break 120 or other failure of infrastructure 125 prevents issuing commands in messages using the preferred (typically least expensive but possibly more reliable or more secure) mode of communication (typically the Internet). As shown in FIG. 1 terminal 360 may use antenna 361 (typically cellular) to transmit radio signal 362 to antenna 111 for relay to antenna 351, however a person of skill in the art of electronic communications would understand that a device such as transception adaptor 355 may also be connected to terminal 360 in order to provide it with access to additional alternate modes.

Switching modes may be accomplished either manually or automatically. Manual switching is operator controlled and may be accomplished using any of a number of conventional physical or software switching technologies or combinations thereof. Automatic switching necessitates access to the AMS for switching agent 375 to follow, which defines which mode selected from a group of enabled modes should have priority. Assuming that the Internet is the primary mode "M1" and land-line telephone modem is secondary mode "M2", some sample AMS rules are:

1. If available, always use M1, but if unable to connect to M1 after X attempts to login, then switch to M2.
2. If unable to connect to M2 after Y attempts to login, then switch to M3—et cetera.
3. M1 is deemed to have failed (hence switch to M2) if any of the following criteria are met:
   a) MP1 (Message Processor) cannot ping external IP address XXX.XXX.XXX
      (Internet Down)
   b) MP1 cannot ping internal IP address 10.10.XXX.XXX
      (Intranet Down)
   c) MP1 is not receiving a heartbeat from watchdog agent 455 on machine "X", for example Trigger Agent 365
      (either Network or MP1 Down)
   d) MP1 is not receiving a heartbeat from watchdog agent 452 on MP2
      (either Service or MP1 Down→Fail Over to MP2 Proxy 450)

Regardless of either the cause of any loss of access to the primary mode or the alternate mode selected in response thereto, means, accessible at WID 310 or Proxy 350 (or ME 101 if the connection is direct) or all, are required for monitoring or sensing that the primary mode of communication is no longer usable. According to an embodiment preferred from a security perspective, before Proxy 350 determines whether or not messages arriving via an alternate mode should be accepted for processing, it is prudent to confirm whether or not the "normal" mode remains in operation, since it is less likely that authentic message traffic will arrive via an alternate mode if the primary mode remains fully operational.

The means by which Agent 315 on WID 310 or Agent 345 on Proxy 350 monitors an external source typically comprises any suitable test transmission using the primary mode to that external source. For example, Packet InterNet Groper or "ping" is used to test access to devices by sending them one or more, Internet Control Message Protocol ("ICMP") echo requests and waiting for replies. Since "pinging" works at the IP level its server-side may be implemented within the operating system kernel making it the lowest level test of whether a remote host is alive, such that pinging is often effective even when higher level, TCP-based, services cannot. Also, the Unix command "ping" can be used to measure round-trip delays in case the primary mode, although operational, is congested. ICMP is an extension to the Internet Protocol (IP) that allows for the generation of error messages, test packets, and informational messages related specifically to IP, such that if it becomes necessary to switch to a tertiary mode from a non-IP secondary mode, non-IP services that test connectivity may become necessary.

The initial connection between devices needing to use an alternate mode may be established from either end. It is contemplated that the earlier discussed means for monitoring availability of the primary mode of communication may be installed at one end or at both ends of the communication path, in different embodiments of the system of the present invention. Although according to the simplest embodiment of the system of the present invention devices can be pre-programmed to switch to a default alternate mode, if the primary mode (e.g. the Internet) M1 is down each transception adaptor 355/switching agent 375 pair cannot use it to share the information needed to agree to a particular alternate mode of communication. Each element of a pair can, acting upon independent information that a problem exists with M1, initiate or await the initiation of a session from the other element. Although the communication between WID 310 and MP1 Proxy 350 is bi-directional, typically an Administrator would initiate a session from either WID 310 or Terminal 360. According to a preferred embodiment all alternate modes are pre-enabled with access rights fully established. It is also contemplated however that alternate modes may be enabled on an "as required" basis (typically to reduce costs), which would involve some relative delay initiating a session while mode access availability is confirmed and rights are negotiated by the initiating and receiving devices. Notwithstanding that different service providers will make a range of different rights available to their subscribers from time to time and the packages of such rights (e.g. high-speed, data storage, etc) will also vary across the different alternate modes, the basic right required in all cases is access to use the mode as part of a path on which to transfer messages between the initiating and receiving devices.

Given the emergent nature of the circumstances typically resulting in the need to change modes any delay may be unacceptable, however for installations in which budget is the main concern, "as required" enablement is likely accompanied by the preference to restore the primary mode immediately upon availability rather than waiting to switch back when the primary mode has by any means (defined in the AMS) demonstrated stability. For example, according to a preferred embodiment, available alternate modes (e.g. M2, M3, M4 etc) are all pre-enabled, and an AMS defines how the subject system shall react to a loss of access to primary mode M1 (e.g. the Internet). Assuming that sessions will be initiated by the User of an authorized administration device such as WID 310, and no session is in progress when an emergent event causing loss of access to primary mode M1 occurs, an Administrator using WID 310 may attempt to establish a session with Proxy 350, without success—while at some point in time proximate the emergent event, Trigger Agent 365 (whether independently or as part of Proxy 350) detects the loss of access to primary mode M1 and commences execution of the AMS.

According to a preferred embodiment, once MP1 Proxy 350 is aware of its loss of access to primary mode M1 a number of preparatory functions (e.g. test for access to each alternate mode) set out in the AMS may be executed in order to place Proxy 350 into a "ready" state, and switching agent 375 can commence listening for messages using one or more of the alternate modes immediately or after MP1 Proxy 350 is ready. Consequently, when WID 310 attempts to use alternate mode M2 (e.g. Mobitex) to establish a session with MP1 Proxy 350, session initiation is expedited by the ready state into which MP1 Proxy 350 has already been placed. Switching agent 375 (whether independent or a module of MP1 Proxy 350) may monitor M2, then M3 (e.g. satellite), then M4 et cetera in accordance with the rules of the particular AMS or it may accept message traffic on any of the then available alternate modes in case more than one mode has been rendered inaccessible by the emergent event that caused the loss of access to primary mode M1. Upon receiving an apparently authorized request using M2, switching agent 375 can deliver the message to MP1 Proxy 350 for further handling including authentication. If properly authorized and all other "tests" dictated by Agent 345 are met, then MP1 Proxy 350 will process the request and commence establishing a session with WID 310. In accordance with the AMS the various devices may monitor for the restoration of access to primary mode M1 and continue to operate in an alternate mode for a period of time thereafter, or negotiate a mid-session return to primary mode M1 as soon as possible. A person of skill in the art of designing backup communication for emergent circumstances would understand that a range of rules in the AMS is possible and appropriate having regard to the context in which each of the message processors and their managed entities operate.

According to another embodiment, preferred from a security perspective, the communicating devices (here WID 310 and Proxy 350) may concurrently send and receive messages via multiple modes of communication all of which are enabled and fully accessible. Although conceived for use with very distressed networks, this method may be used during normal or emergent circumstances in order to make it more difficult for a single threat to intercept all packets in a single session. Whether in a simple "rolling" manner or according to a more complex pattern of switching the system of the present invention may switch from the primary mode to various alternate modes and then between alternate modes and then, for example, back to the primary mode breaking up the stream of packets comprising a session for delivery using a plurality of non-redundant modes. For example, as packets relating to a response are received via satellite mode, packets relating to the next request are simultaneously being sent using microwave mode, making it very difficult for a third party to capture an entire message.

It is contemplated that switching agent 375 can alternate in a predetermined manner between the available alternate modes of communication following various patterns, for example: send Request 1 using mode M1 (e.g. Internet), receive Reply 1 to Request 1 on mode M2 (e.g. satellite), send Request 2 using mode M3 (e.g. microwave), receive Reply 2 to Request 2 on mode M1 (e.g. Internet), send Request 3 on mode M2 (satellite), receive Reply 3 to Request 3 on mode M1 (Internet), et cetera. The sequence of mode switching could be a simple cycling (as set out above) or a more complex (and secure) "mode hopping" based on a randomly generated bit pattern known only by the remote input device and the managed entity or its message processor. According to one embodiment of the more sophisticated sequence, synchronized random number generators are pre-installed, for example, on each of a RID and a proxy such that at any point in time the devices always have access to the same bit pattern that they may use without having to exchange or otherwise share that pattern. The pattern may be used in an algorithm for determining how to hop between modes. According to a different embodiment of the more sophisticated sequence, technologies such as RSA's SecurID two factor authentication generate valid numbers that (in addition to authentication) may then be shared on a pre-agreed alternate mode (e.g. M2) by any secure means, and also used in an algorithm for determining how to hop between modes during the session commenced on M2.

It is further contemplated that the different modes of communication may be granted different LAN access rights for a variety of reasons, some of which restrictions promote security. For example, inherently less secure modes (e.g. any mode involving broadcast) may only be trusted to deliver messages that include commands that are less sensitive, which is particularly relevant to use in network administration applications where some commands (e.g. reboot a printing device) are less sensitive than other commands (e.g. add a new authorized User). By further example, where economy is paramount, a mode having a narrow bandwidth or large latency may only be permitted to carry out select administrative commands not requiring the exchange of large blocks of data.

According to another embodiment, preferred from an economy perspective, when switching from M1 130 to M2 401 or M2 401 to M3 402, trigger agent 365 in cooperation with switching agent 375 launches an application or activates a module to monitor for the restoration of access to primary mode M1 and then alert switching agent 375 when the temporary interruption has ended, also enabling alternate mode M2 or confirming connectivity for that mode if pre-enabled.

According to another embodiment, preferred from a reliability perspective, while the primary message processor MP1 (e.g. Proxy 350) is using its various available alternate modes of communication it will also have "Fail Over" protection by transmitting "heartbeat" signals, typically via bus 130, such that one or more backup message processors detecting those heartbeats will remain dormant. However once MP1 Proxy 350 has enabled its final alternate mode and failed to establish communication with managed entity 101, MP1 Proxy 350 stops transmitting heartbeats the absence of which will trigger backup processors MP2 Proxy 450, MP3 Proxy 550, et cetera, pursuant to the rules of the AMS, also in accordance with which AMS MP3 Proxy 550 may monitor for the absence of heartbeat of MP2 Proxy 450 before MP3 Proxy 550 is triggered into operation in sequence to take over the role of MP1 Proxy 350 from MP2 Proxy 450. For such installations in which the Network Administrators can afford to and have implemented redundant message processors MP1 Proxy 350, MP2 Proxy 450, MP3 Proxy 550 et cetera, each of which is configured to control the same group of mission critical Managed Entities, the heartbeats can be transmitted between the redundant message processors to permit them to respond (in a predetermined manner and sequence) to the absence of any of those heartbeat transmissions. Typically MP2 Proxy 450 and MP3 Proxy 550 will follow the same priority list (cheapest to most costly) of alternate modes of communication, however it is contemplated that in high-security applications at least one of the message processors (and Managed Entities) may be located in a hardened environment such as a bunker, and the loss of certain devices may be treated as more significant than the loss of others. In that context the loss of a particular external message processor, such as MP2 Proxy 450, may trigger its "next in command", say MP3 Proxy 550, to upgrade or otherwise alter its priority to a more costly mode that has a higher probability of communicating on the first try. For example if a terrorist attack were in progress, then a land-borne assault could relatively easily damage all of: fibre-optic cables, telephone lines, and cellular towers. However, terrorists with ground-based weapons would be less likely to have access to space-borne weapons capable of destroying high orbit satellites. Consequently, if a corporation determined that in certain scenarios a system lock-down were the best course of action until the threat passes, then the purpose of MP3 Proxy 550 might be severely restricted compared to fully enabled MP1 Proxy 350 and MP2 Proxy 450 configured for routine administration although also being lock-down enabled.

According to a preferred embodiment of the method of the present invention, after MP2 Proxy 450 detects the absence of the heartbeat of MP1 Proxy 350 such that MP2 Proxy 450 activates, and after MP2 Proxy 450 establishes communication through an alternate mode, for example M4, MP2 Proxy 450 will continue to try to communicate with MP1 Proxy 350, which may have suffered only a temporary interruption of access to M1 such that MP1 Proxy 350 (after MP2 Proxy 450 was activated) establishes connectivity with managed entity 101 via the relatively lower cost mode M2, such that control may economically be returned from MP2 Proxy 450 to MP1 Proxy 350. Similarly, if MP1 Proxy 350 has at best established communication via M4, but MP2 Proxy 450 alerts MP1 Proxy 350 that it has accessed a higher priority mode, say M2, then MP1 Proxy 350 may be directed by the fail-over rules in the AMS to transfer control to MP2 Proxy 450 even though MP1 Proxy 350 is not failed and has re-established communication.

A person of skill in the art of backup communication would understand that fail-over sequences could be included in the AMS or otherwise stored on the Managed Entity, Switching Agent, or Watchdog Agent devices or on a combination thereof to perform certain actions if loss of communication between the interconnected, redundant message processors is detected. And, if the loss in communication is not combined with normal shutdown procedures, then the managed entity 101 or the message processor Proxy 350 could also execute applications taking protective measures that delete sensitive files X, Y, and Z, and shut-down managed entity 101, or lock-down the data bearing drives and initiate local or remote alarms. If a Watchdog Agent onboard a redundant device (e.g. MP2 Proxy 450) detects that the device (e.g. MP1 Proxy 350) that it monitors is no longer accessible then it may take steps to establish itself (temporarily) in place of that device. For example, if MP1 Proxy 350 in Houston goes off-line such that MP2 Proxy 450 in Atlanta is unable to communicate with MP1 Proxy 350, then the normally idle MP2 Proxy 450 in Atlanta activates as an backup message processor to replace MP1 Proxy 350.

Figure 2:
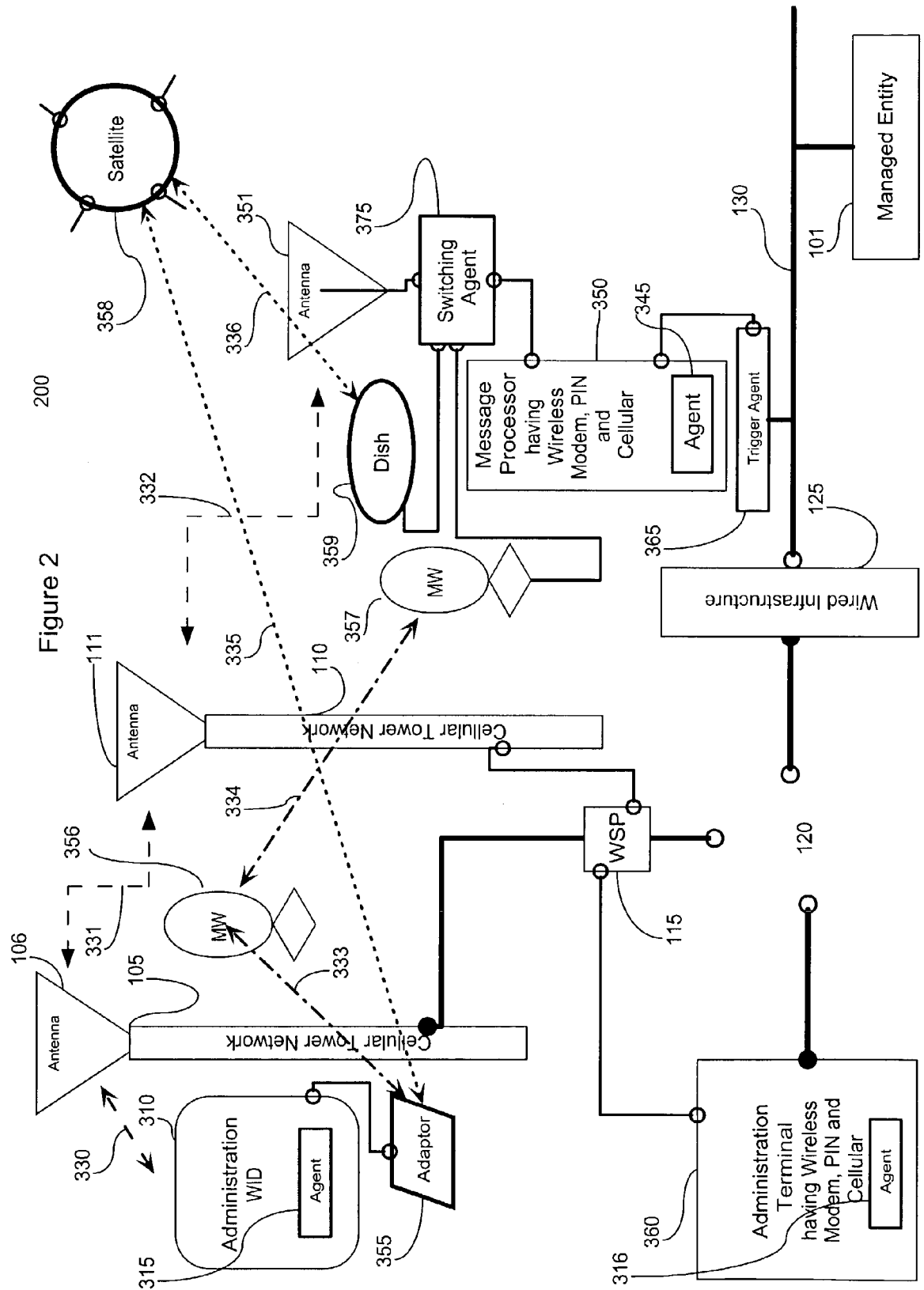
FIG. 2 is an illustration of a preferred embodiment of the system of the present invention according to which the triggering and switching agents operate through a Proxy and the Terminal communicates through an alternate wired mode to a wireless service provider, but the WID has cellular, microwave and satellite alternate modes enabled.

Referring to FIG. 2, there is illustrated an embodiment of the system of the invention denoted generally as 200 according to which, even though neither WID 310 nor Terminal 360 can reach Proxy 350 through the primary mode M1 (which passes through connection 120) WSP 115 has alternate access to tower 110 permitting it relay via signal 332 commands from either WID 310 or Terminal 360 to antenna 351 for processing by switching agent 375 and Proxy 350.

Figure 3:
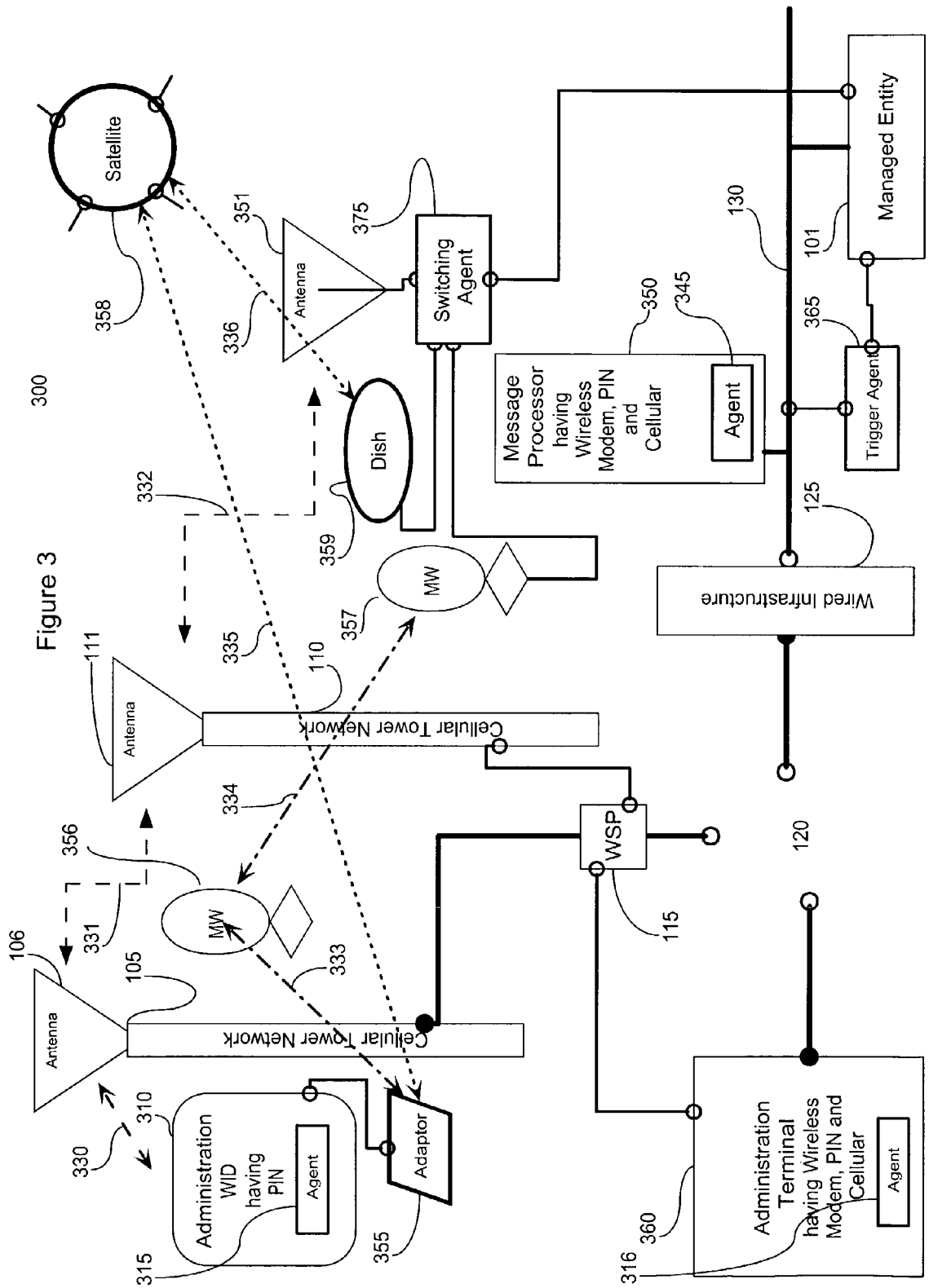
FIG. 3 is an illustration of an embodiment of the system of the present invention according to which the triggering and switching agents connect to the managed entity and the Terminal communicates through an alternate wired mode to a wireless service provider, but the WID has cellular, microwave and satellite alternate modes enabled.

Referring to FIG. 3, there is illustrated an alternate embodiment of the system of the invention denoted generally as 300 according to which Trigger Agent 365 and switching agent 375 each communicate with a particular managed entity 101 directly. It is contemplated that although under normal circumstances Proxy 350 would pre-process all commands for managed entity 101, under emergent circumstances it may be safer and faster to access select devices (here managed entity 101) directly, perhaps with authorization for only a limited instruction set (such as backup and lock down), in order to avoid the risk that connectivity will be lost before a mission critical device can be secured. A portion of the software that comprises Agent 345 could be loaded onto managed entity 101 or Trigger Agent 365 or switching agent 375 or any suitable combination thereof, in order to permit managed entity 101 to process commands normally pre-processed by Proxy 350 that according to system 300 is bypassed in emergent circumstances. In the event that Proxy 350 is still accessible, during the particular emergent circumstances, the data stream received by switching agent 375 could be buffered by managed entity 101 or Trigger Agent 365 until processed by Proxy 350, effectively forming a hybrid method having the advantage of a heightened state of awareness by managed entity 101 while still enjoying at least some of the benefits of using Proxy 350. It is contemplated that if according to system 300 communication were lost between Trigger Agent 365 and managed entity 101, then a short fail-over sequence stored on board managed entity 101 would be executed to minimize the risk potentially arising from connection to an apparently damaged intranet.

Assuming that trigger agent 365 detects the loss of access to the primary mode via bus 130 and alerts managed entity 101 to this fact before trigger agent 365 loses communication with managed entity 101, a heightened state of readiness may be initialized in managed entity 101 that thereafter accepts only a restricted set of commands received in messages arriving via any of the alternate modes then available. According to a preferred embodiment this heightened state of readiness is accompanied by additional preliminary operations directed at preparation for lock down, even prior to receipt of such commands via any alternate mode. Operating under a restricted command set and ready to execute lock down, managed entity 101 may then select one or more alternate modes in accordance with the AMS and attempt to continue to operate in response to authorized commands received in authenticated messages from WID 310 or Terminal 360. At any time during such restricted operation lock-down may be triggered by events such as the loss of access to either trigger agent 365 or switching agent 375, or the interruption of primary power such that emergency shut down proceeds using the backup power of an uninterruptible power supply. Many variations will now occur to a person of skill in the art.

Figure 4:
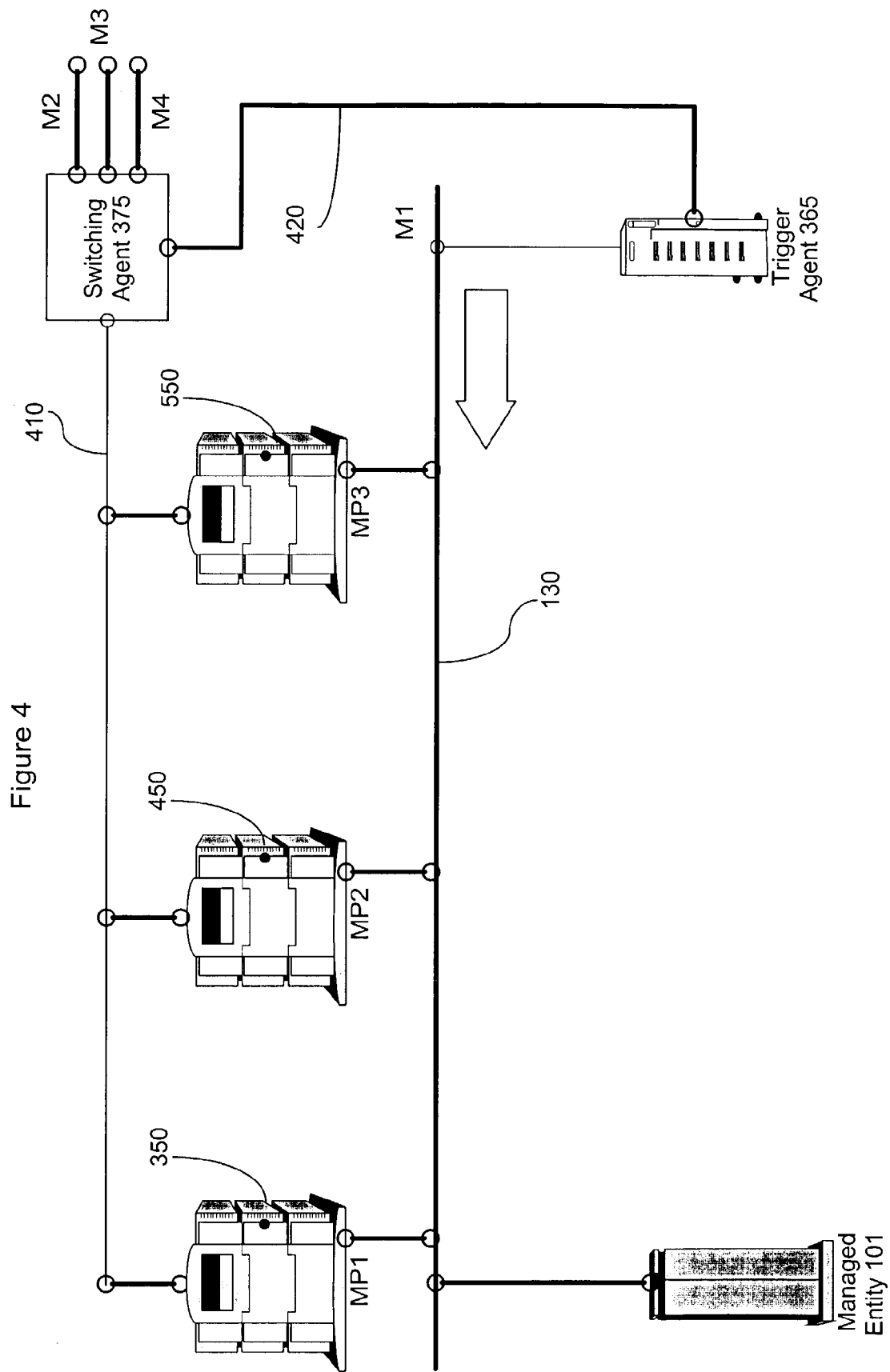
FIG. 4 is an illustration of one embodiment of the fail-over elements of the system of the present invention.

Referring to FIG. 4, there is illustrated an embodiment of a portion of the system of the invention showing 3 redundant message processors (MP1 Proxy 350, MP2 Proxy 450, MP3 Proxy 550) each cable of providing the functionality of Proxy 350. A person of skill in the art of designing backup and fail over systems would understand that although Proxy 450 and Proxy 550 are connected to bus 130 in order for each to have access to managed entity 101, Proxy 450 and Proxy 550 may be physically isolated from Proxy 350 and from one another in order to reduce the risk that all 3 message processors will be lost as a result of an event giving rise to the emergent circumstances for which they were enabled. It is contemplated that the fail-over process will provide information useful in isolating the source of the connectivity problem such that notification may be provided to service personnel to correct the situation if possible.

Trigger agent 365 is connected by any suitable means to bus 130, being the source of access to primary mode M1 by which all of the message processors communicate with administrative devices WID 310 and Terminal 360. In the present example, trigger agent 365 needs to monitor bus 130 in order to detect any interruption of M1 to the message processors or to managed entity 101. Although shown as a standalone device, trigger agent 365 may be integrated with switching agent 375 or it may be a module associated with other devices such as a message processor. Similarly, switching agent 375 although shown as a separate device may be implemented in any suitable form. For example, having suitable connections dependent upon the nature of modes M2-M4, switching agent 375 could be a motherboard card or a USB device plugged into Proxy 350 directly. According to a preferred embodiment switching agent 375 is a standalone device communicating with the message processors through a high-priority interrupt or via an override function capable of substituting switching agent 375's line 410 (e.g. by relays) for bus 130. Switching agent 375 may be enabled upon receiving a trigger signal from trigger agent 365 on line 420, which although shown as external, may be an internal connection in an integrated device or sent over a common bus such as 130 to which switching agent 375 may have access in emergent circumstances.

Advantageously, according to a preferred embodiment, WID 310 does not communicate directly with any Managed Entity 101, instead Proxy 350 delivers the required instructions to each Managed Entity 101 and Proxy 350 prevents User requests, for operations that they are not allowed to perform, from ever reaching Managed Entity 101, thereby enhancing overall system efficiency and security. This embodiment may be operated in 2 modes: all User information is unique to the service with no LAN related identifiers ever exchanged outside the firewall, or with User identifiers that relate to the LAN or to a specific Managed Entity delivered from outside the firewall for further handling by Proxy 350, never directly from WID 310 to Managed Entity 101.

A person of skill in the art of designing backup communication systems would understand that in a system having a primary message processor with at least one backup message processor, any of the message processing devices may be configured to provide or exchange signals typically in the form of small data packets (commonly known as "heartbeat signals", "keep-alive packets", "watch-dog packets", or "ACK's") for the purpose of confirming the operational status of the other devices, and, in the event that the primary message processor is not responsive, to triggering the operation of at least one backup message processor or an agent thereof.

Figure 5:
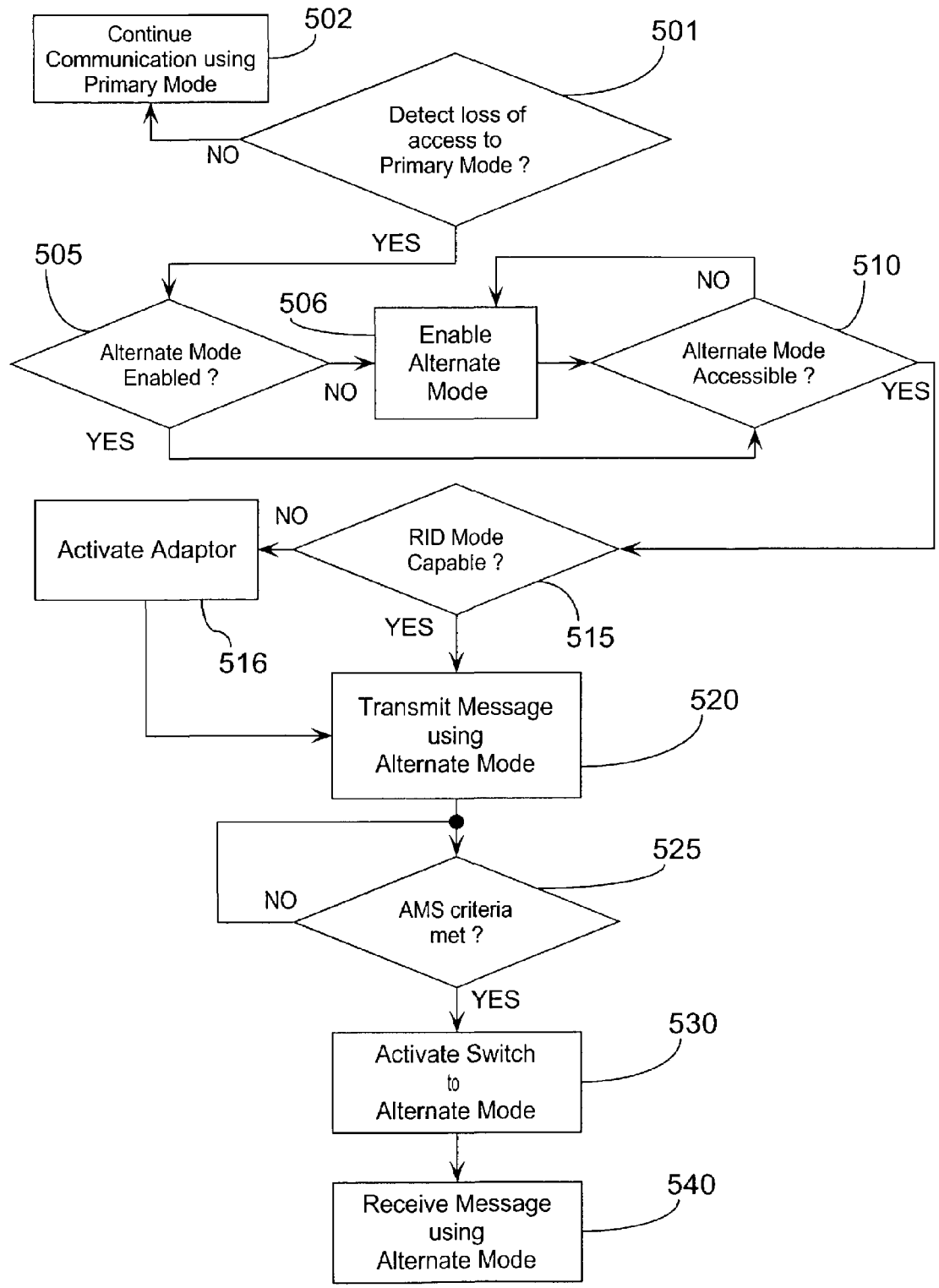
FIG. 5 is an illustration of one embodiment of the method of the present invention.

Referring to FIG. 5, there is illustrated an embodiment of the method of the invention according to which there is at step 501 a monitoring of access to the primary mode of communication (e.g. the Internet). As long as that access continues, the devices (typically a remote input device and a managed entity or a message processor acting as proxy to the managed entity) continue 502 to use the primary mode of communication.

According to the example illustrated, once the remote input device ("RID") detects or is otherwise aware of a loss of access to the primary mode of communication, at step 505 it determines if an alternate mode has been enabled. If no alternate mode is enabled, then at step 506 at least one alternate mode is enabled by obtaining the identifiers and rights necessary to use the subject mode. If at least one alternate mode is enabled, then one mode is selected in accordance with the rules of the AMS and at step 510 tests (typically a test transmission, such as a ping) to confirm adequate accessibility (in accordance with the rules of the AMS) using the selected mode. If for any reason the access to the selected mode is insufficient, then enablement is confirmed or re-established or an different alternate mode is selected and tested for accessibility. Once it is confirmed that an alternate mode is both enabled and adequately accessible, then the RID needs to prepare 515 to use that mode to send its message. If the RID is a fully integrated multi-mode capable device, then proceeding to transmit 520 directly is simple. However, if the RID is capable of using only modes that do not include the selected mode confirmed as both enabled and adequately accessible, then an adaptor needs to be activated 516 through which message transmission 520 may take place using the selected alternate mode.

At the receiving end of the communication path (in the present example the managed entity or its Proxy) the device will not have received communication for a period of time as a result of the interruption to the primary mode of communication. Whether on a simple time basis or after independently testing for access to the primary mode of communication, there will be criteria in the AMS according to which, once met at step 525 the receiving device will be triggered to switch to at least one alternate mode 530 (in accordance with the rules of the AMS). Until the AMS criteria are met the trigger at the receiving device may continue to idle or monitor for access. Once the switch to an alternate mode commences, the receiving device may simply cycle through each of its pre-enabled modes until it receives a valid message 540 on the mode selected by the sending device (in the present example the RID). However, it is contemplated that according to an alternate embodiment the receiving device may also proceed through steps 505, 506, and 510 to select one or modes suited to re-establishing communication with the sending device on a mode other than the primary mode. A person of skill in the art would also understand that an adaptor may be used at each of the communication path.

Figure 6:
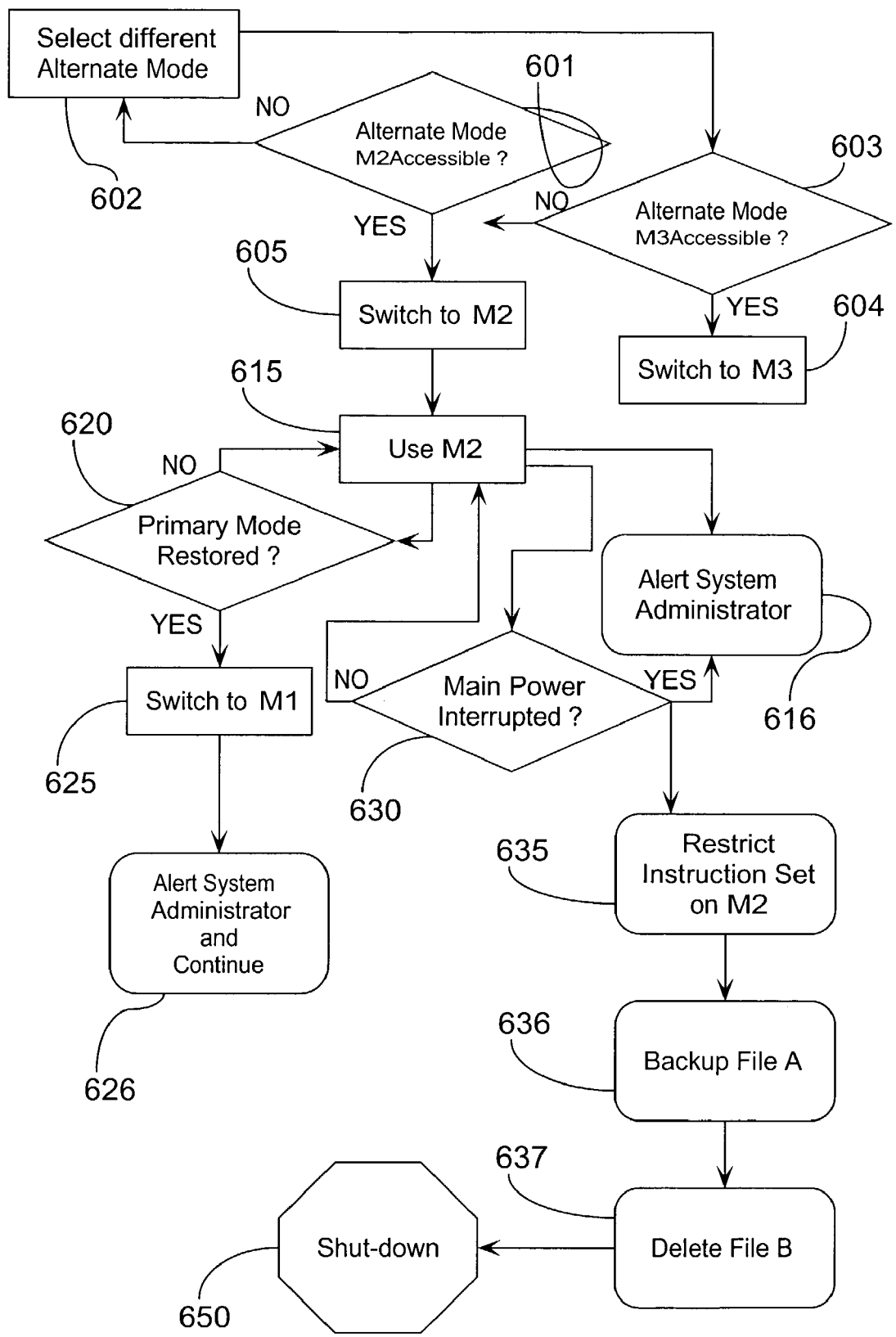
FIG. 6 is an illustration of one embodiment of a subset of the AMS.

Referring to FIG. 6, there is illustrated an embodiment of a subset of the AMS to which a preferred embodiment of the system of the present invention may refer for instructions. At step 601 the primary mode has been interrupted causing the system to determine if the first alternate mode M2 is accessible. If not, then at step 602 the system selects a different mode pre-defined in the AMS as M3 for which it checks accessibility at step 603 and to which it switches at step 604. However, it is also contemplated that steps 601 and 603 could occur either sequentially or simultaneously. On the other hand, assuming that M2 is accessible, at step 605 the system switches to and then at 615 proceeds to use alternate mode M2 while altering the system administrator of this change of mode at step 616. Periodically while using M2 the system at step 620 checks to see if the primary mode M1 has been restored. If not, then the system continues to use M2. If at some point the primary mode is restored, then at step 625 a switch to M1 is effected and at 626 the system administrator is alerted and communication continues under normal operating conditions.

According to the embodiment illustrated, during the continuing use of alternate mode M2 the system will be transferred into a further heightened state at step 630 if its own main power has been interrupted, such that while backup power permits, the system immediately alerts the system administrator, restricts the instruction set at 635 permitting it to accept only limited commands still being received via M2, takes protective measures at step 636 (backing up key files) and step 636 (deleting sensitive files) prior to step 650 shutting down until the system administrator investigates and takes appropriate steps to intervene. It is contemplated that steps 601 and 603 could occur either before or after primary mode failure has been detected.

Further, it is to be understood that primary mode failure detection or triggering need not be at both ends of the communication path. For example, primary mode failure may be detected only by WID 310, which uses an alternate mode to alert Proxy 350 according to a more costly embodiment in which the system permits the managed entity or its proxy to listen on all modes at all times. The message from the WID 310 could be used to both alter Proxy 350 to the loss of access to M1, and trigger the process of selecting an accessible alternate mode or provide instructions respecting which mode to use.

Although the disclosure describes and illustrates various embodiments of the invention, it is to be understood that the invention is not limited to these particular embodiments. Many variations and modifications will now occur to those skilled in the art of backup communication. For full definition of the scope of the invention, reference is to be made to the appended claims.

We claim:

1. A system for delivering a message between a remote input device and a managed entity by selectively using a primary mode of communication, a first alternate mode of communication and a second alternate mode of communication, the system comprising:
    an adaptor coupled between said remote input device and said managed entity, said adaptor, upon determining that said managed entity is not responsive to said message transmitted using said primary mode of communication, providing access to the first alternate mode of communication and transmitting said message using said first alternate mode of communication;
    a switch electrically coupled to said managed entity and located between said managed entity and said remote input device, said switch having a signal converter and an antenna for receiving said message and transmitting a response thereto using said first alternate mode of communication, wherein said switch is configured to receive data on said first alternate mode of communication and switch to said second alternate mode of communication in accordance with at least one rule respecting the usage of said first and second alternate modes of communication when said managed entity has lost access to said primary mode of communication; and
    a detector for detecting loss of access by said managed entity to said primary mode of communication; whereby, upon said detector detecting said loss of access, said detector controls said switch to enable receipt by said managed entity of said message using said at least one of said first and second alternate modes of communication.

2. The system as claimed in claim 1 further comprising a primary message processor for receiving said message as a proxy for said managed entity, said primary message processor comprising any server adapted for connection to said primary mode of communication as well as to said managed entity.

3. The system as claimed in claim 2 further comprising at least one backup message processor for receiving said message in the event that said primary message processor is not responsive to signals sent to said primary message processor.

4. The system as claimed in claim 1 wherein said primary mode of communication comprises the Internet.

5. The system as claimed in claim 4 wherein said managed entity comprises a server connected to a LAN and said remote input device comprises a portable computing device having access to the Internet through radio communication.

6. The system as claimed in claim 4 wherein said managed entity comprises a server connected to a LAN and said remote input device comprises a computing device having access to the Internet through radio communication.

7. The system as claimed in claim 4 wherein said managed entity comprises a server connected to a LAN and said remote input device comprises a computing device having access to the Internet through wired communication.

8. The system as claimed in claim 1 wherein said managed entity comprises a server and said remote input device comprises a computing device adapted for communication with a managed entity by a wired or wireless mode of communication selected from the group consisting of: telephony, satellite, microwave, other radio, laser, and infrared.

9. The system as claimed in claim 1 wherein said remote input device comprises a wireless input device having loaded thereon an agent configured to transmit a message and receive a response relating to said managed entity.

10. The system as claimed in claim 9 wherein said wireless input device comprises a radio-based device selected from the group consisting of: cell phone, pager, personal digital assistant, and portable computer.

11. The system as claimed in claim 1 wherein said remote input device comprises a multi-mode capable wireless input device having a cellular mode or satellite mode wireless transceiver, said remote input device further comprising an agent configured to transmit a message and receive a response relating to said managed entity.

12. The system as claimed in claim 1 wherein said remote input device comprises a computing device having loaded thereon an agent configured to transmit a message and receive a response relating to said managed entity.

13. The system as claimed in claim 1 wherein said remote input device includes a signal converter and said adaptor selectively connects said first and second modes of communication to said remote input device.

14. The system as claimed in claim 1 wherein said detector comprises an agent for monitoring an external source that is accessed using said primary mode of communication, said agent configured to activate said switch in the event that said agent is unable to access said external source.

15. The system as claimed in claim 14 wherein said agent monitors an external source by sending a test transmission to said external source.

16. The system as claimed in claim 1 wherein said adaptor is responsive to instructions from said switch and said at least one rule comprises an operational requirement to execute a pattern of switching between said first and second alternate modes of communication.

17. The system as claimed in claim 16 wherein said switch terminates the pattern of switching upon confirmation of the restoration of access to said primary mode of communication and switches to said primary mode of communication.

18. The system as claimed in claim 1 wherein said adaptor and said switch negotiate when to switch between said first and second alternate modes of communication as well as which of said first and second alternate modes of communication to switch to.

19. The system as claimed in claim 1 further wherein said at least one rule is part of an Alternate Mode Sequence comprising a plurality of rules respecting when to switch between said first and second alternate modes of communication as well as which of said first and second alternate modes of communication to switch to.

20. The system as claimed in claim 1, wherein the detector comprises at least one of: (1) a receiver for receiving a heartbeat transmission from said external source, (2) a transceiver for sending, and receiving a response to, at least one Internet Control Message Protocol echo request to/from said external source, and (3) a quality of service metric measuring device.

21. A method for delivering a message between a remote input device and a managed entity, for use when loss of access by either said remote input device or said managed entity to a primary mode of communication has been detected, comprising the steps:

enabling at least one alternate mode of communication;
transmitting said message using at least one of said at least one alternate mode of communication;
activating a switch to permit the reception of said message using at least one of said at least one alternate mode of communication;
placing, after loss of access to said primary mode of communication is detected, said managed entity into a higher state of readiness and monitoring, using said switch, said at least one alternate mode of communication for the purpose of receiving said message;
processing commands received in said message via said at least one of said at least one alternate mode of communication if and only if said commands are included in a restricted instruction set; and
monitoring packets from a reliable local device to determine a status of communication with the reliable local device, and, if the packets for determining the status of communication with the reliable local device are absent, then executing at least one instruction from the group comprising: backup directory, save registry, delete file, alert System administrator, create log, alert User, lock down, and shut-down.

22. The method as claimed in claim 21 wherein delivery of said message is between a remote input device and a primary message processor receiving said message as a proxy for said managed entity.

23. The method as claimed in claim 22 wherein delivery of said message is between a remote input device and at least one backup message processor for receiving said message in the event that said primary message processor is not responsive to signals sent to said primary message processor.

24. The method as claimed in claim 22 wherein authentication and authorization are completed by said primary message processor acting as a proxy for at least one said managed entity.

25. The method as claimed in claim 21 wherein said message is encoded by applying a symbolic representation of groups of commands or an encryption of said representation for the purpose of making said message smaller in size or more difficult to access.

26. The method as claimed in claim 21 wherein said placing comprises the step of initializing a limited instruction set on said managed entity, including at least one instruction selected from the group comprising: backup directory, save registry, delete file, alert System Administrator, create log, alert User, lock down, and shut down.

27. The method as claimed in claim 21, wherein the enabling comprises enabling the at least one alternate mode of communication in accordance with an Alternate Mode Sequence comprising a plurality of rules respecting when to switch between alternate modes of communication as well as which of said alternate modes of communication to switch to.

28. A method for delivering a message between a remote input device and a managed entity having at least one pre-enabled alternate mode of communication, for use when loss of access by either said remote input device or said managed entity to a primary mode of communication has been detected, comprising the steps:

selecting at least one alternate mode of communication;
transmitting said message using at least one of said at least one alternate mode of communication;
activating a switch to permit the reception of said message using at least one of said at least one alternate mode of communication;
processing commands received in said message via said at least one of said at least one alternate mode of communication if and only if said commands are included in a restricted instruction set, wherein said restricted instruction set is based on said alternate mode of communication selected and restricts administrative command rights based on criteria selected from the group consisting of: bandwidth, security, reliability or quality-of-service; and
monitoring packets from a reliable local device to determine a status of communication with the reliable local device, and, if the packets for determining the status of communication with the reliable local device are absent, then executing at least one instruction from the group comprising: backup directory, save registry, delete file, alert System administrator, create log, alert User, lock down, and shut-down.

29. The method as claimed in claim 21 or claim 28 further comprising the steps:
monitoring for the restoration of access to said primary mode of communication, and
switching from said at least one alternate mode of communication to said primary mode of communication.

30. A method for delivering a message between a remote input device and a managed entity, for use when loss of access by either said remote input device or said managed entity to a primary mode of communication has been detected, comprising the steps:
enabling at least one alternate mode of communication;
transmitting said message using at least one of said at least one alternate mode of communication;
activating a switch to permit the reception of said message using at least one of said at least one alternate mode of communication;
processing commands received in said message via said at least one of said at least one alternate mode of communication if and only if said commands are included in a restricted instruction set, wherein said restricted instruction set is based on said alternate mode of communication enabled and restricts administrative command rights based on criteria selected from the group consisting of: bandwidth, security, reliability or quality-of-service; and
monitoring packets from a reliable local device to determine a status of communication with the reliable local device, and, if the packets for determining the status of communication with the reliable local device are absent, then executing at least one instruction from the group comprising: backup directory, save registry, delete file, alert System administrator, create log, alert User, lock down, and shut-down.

* * * * *